US012659935B2

(12) United States Patent
Zhang et al.

(10) Patent No.: US 12,659,935 B2
(45) Date of Patent: Jun. 16, 2026

(54) WIRELESS COMMUNICATION METHOD AND TERMINAL DEVICE

(71) Applicant: GUANGDONG OPPO MOBILE TELECOMMUNICATIONS CORP., LTD., Dongguan (CN)

(72) Inventors: Shichang Zhang, Dongguan (CN); Yi Ding, Dongguan (CN); Zhenshan Zhao, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 326 days.

(21) Appl. No.: 18/212,804

(22) Filed: Jun. 22, 2023

(65) Prior Publication Data

US 2023/0354269 A1 Nov. 2, 2023

Related U.S. Application Data

(63) Continuation of application No. PCT/CN2020/139632, filed on Dec. 25, 2020.

(51) Int. Cl.
| | |
|---|---|
| *H04W 72/02* | (2009.01) |
| *H04W 28/26* | (2009.01) |
| *H04W 72/1263* | (2023.01) |
| *H04W 72/25* | (2023.01) |

(52) U.S. Cl.
CPC ........... *H04W 72/02* (2013.01); *H04W 28/26* (2013.01); *H04W 72/1263* (2013.01); *H04W 72/25* (2023.01)

(58) Field of Classification Search
None
See application file for complete search history.

(56) References Cited

U.S. PATENT DOCUMENTS

| | | | |
|---|---|---|---|
| 6,456,604 | B1 | 9/2002 | Lee et al. |
| 10,873,838 | B2 | 12/2020 | Hwang et al. |
| 2020/0229145 | A1 | 7/2020 | Kang et al. |
| 2023/0254820 | A1* | 8/2023 | Guo ...................... H04W 72/02 |
| 2023/0269708 | A1* | 8/2023 | Liu ...................... H04L 5/0033 |
| | | | 370/330 |
| 2023/0309134 | A1* | 9/2023 | Leon Calvo ........ H04W 72/563 |

FOREIGN PATENT DOCUMENTS

| | | |
|---|---|---|
| CN | 107770781 A | 3/2018 |
| CN | 111436033 A | 7/2020 |
| CN | 111726147 A | 9/2020 |

(Continued)

OTHER PUBLICATIONS

Extended European Search Report issued in corresponding European application No. 20966639.5, mailed Jan. 16, 2024.

(Continued)

*Primary Examiner* — Jenkey Van

(74) *Attorney, Agent, or Firm* — BAYES PLLC

(57) ABSTRACT

Provided are a wireless communication method and a terminal device. The method includes: transmitting, by a first terminal, a reference resource set to a second terminal through a physical channel in sequence format. The reference resource set is used for the second terminal to perform resource selection or resource reselection, or the reference resource set is used to trigger the second terminal to perform resource selection or resource reselection.

15 Claims, 8 Drawing Sheets

200

(56) References Cited

FOREIGN PATENT DOCUMENTS

| CN | 111867059 A | 10/2020 |
| EP | 4185032 A1 | 5/2023 |
| EP | 4192146 A1 | 6/2023 |
| WO | 2020033088 A1 | 2/2020 |

OTHER PUBLICATIONS

Source: Fujitsu; Title: Considerations on Inter-UE Coordination for Mode 2 Enhancements 3GPP TSG RAN WG1 Meeting #103-E R1-2007788 e-Meeting, Oct. 26-Nov. 13, 2020.

Source: Spreadtrum Communications; Title: Discussion on feasibility and benefit of mode 2 enhancements 3GPP TSG RAN WG1 #103-e R1-2008099 e-Meeting, Oct. 26-Nov. 13, 2020.

CEWiT, "Feasibility and benefits for NR Sidelink mode 2 enhancements", R1-2009291,3GPP TSG RAN WG1 103-e e-meeting, Oct. 16-Nov. 13, 2020.

International Search Report issued in international application No. PCT/CN2020/139632, mailed Sep. 27, 2021.

Written Opinion of the International Searching Authority issued in international application No. PCT/CN2020/139632, mailed Sep. 27, 2021.

LG Electronics, "Feature lead summary for AI 8.11.2.2 Feasibility and benefits for mode 2 enhancements", R1-2009788, #3GPP TSG RAN WG1 #103-e e-Meeting, Oct. 26-Nov. 13, 2020.

Huawei et al., "Inter-UE coordination in sidelink resource allocation", R1-2007616, 3GPP TSG RAN WG1 Meeting #103-e E-meeting, Oct. 26-Nov. 13, 2020.

Samsung, "On Feasibility and Benefits for Mode2 Enhancements", R1-2008190, 3GPP TSG RAN WG1 #103-e e-Meeting, Oct. 26-Nov. 13, 2020.

Ericsson, "Feasibility and benefits of mode 2 enhancements for inter-UE coordination", R1-2009073, 3GPP TSG-RAN WG1 Meeting #103-e e-Meeting, Aug. 17-28, 2020.

Qualcomm Incorporated, "Reliability and Latency Enhancements for Mode 2", R1-2009273, 3GPP TSG RAN WG1 Meeting #103-e Oct. 26-Nov. 13, 2020.

Vivo, "Discussion on mode 2 enhancements", R1-2007689, 3GPP TSG RAN WG1 #103-e e-Meeting, Oct. 26-Nov. 13, 2020.

LG Electronics, "Discussion on feasibility and benefits for mode 2 enhancement", R1-2007896, 3GPP TSG RAN WG1 Meeting #103-e e-Meeting, Oct. 26-Nov. 13, 2020.

Notice of Priority Examination of Patent Application issued in corresponding Chinese Application No. 202080107416.7, mailed Sep. 19, 2024, 6 pages.

First Examination Opinion Notice issued in corresponding Chinese Application No. 202080107416.7, mailed on Oct. 10, 2024, 14 pages.

Result of Consultation issued in corresponding European Application No. 20966639.5, mailed on Oct. 11, 2024, 3 pages.

* cited by examiner base station sidelink base station sidelink

200

WIRELESS COMMUNICATION METHOD AND TERMINAL DEVICE

CROSS-REFERENCE TO RELATED APPLICATION

This application is a continuation of International Application No. PCT/CN2020/139632, filed on Dec. 25, 2020, which is hereby incorporated by reference in its entirety.

TECHNICAL FIELD

Embodiments of the present disclosure relate to the communication field, and more specifically, to a wireless communication and a terminal device.

BACKGROUND

In some sidelink resource selection scenarios, a first terminal needs to send a reference resource set to a second terminal to assist the second terminal in resource selection. However, what kind of physical channel or physical resource is used to send the reference resource set is an urgent problem to be solved.

SUMMARY

Embodiments of the present disclosure provide a wireless communication method and a terminal device. A first terminal may transmit a reference resource set to a second terminal through a PSACH, thereby improving the resource selection performance of the second terminal.

In a first aspect, a wireless communication method is provided, and the method includes:

transmitting, by a first terminal, a reference resource set to a second terminal through a Physical Sidelink Assistant Channel (PSACH);

wherein the reference resource set is used for the second terminal to perform resource selection or resource reselection, or the reference resource set is used to trigger the second terminal to perform resource selection or resource reselection.

In a second aspect, a wireless communication method is provided, and the method includes:

receiving, by a second terminal, a reference resource set transmitted from a first terminal through a PSACH;

wherein the reference resource set is used for the second terminal to perform resource selection or resource reselection, or the reference resource set is used to trigger the second terminal to perform resource selection or resource reselection.

In a third aspect, there is provided a terminal device, configured to perform the method in the first aspect above.

Specifically, the terminal device includes a functional module for performing the method in the first aspect above.

In a fourth aspect, there is provided a terminal device, configured to perform the method in the second aspect above.

Specifically, the terminal device includes a functional module for performing the method in the second aspect above.

In a fifth aspect, there is provided a terminal device, including a processor and a memory. The memory is used to store a computer program, and the processor is used to call and run the computer program stored in the memory to perform the method in the first aspect above.

In a sixth aspect, there is provided a terminal device, including a processor and a memory. The memory is used to store a computer program, and the processor is used to call and run the computer program stored in the memory to perform the method in the second aspect above.

In a seventh aspect, there is provided an apparatus for implementing the method in any one of the first aspect to the second aspect above.

Specifically, the apparatus includes a processor, configured to call and run a computer program from a memory, to call a device installed with the apparatus to perform the method in any one of the above first to second aspects.

In an eighth aspect, there is provided a computer-readable storage medium for storing a computer program, and the computer program causes a computer to perform the method in any one of the above first aspect to the second aspect.

In a ninth aspect, there is provided a computer program product, including computer program instructions, and the computer program instructions cause a computer to perform the method in any one of the above first to second aspects.

In a tenth aspect, there is provided a computer program, which, when running on a computer, causes the computer to perform the method in any one of the above first to second aspects.

Through the above technical solutions, the first terminal can transmit the reference resource set to the second terminal through the PSACH, thereby improving the resource selection performance of the second terminal.

DETAILED DESCRIPTION

Figure 1:
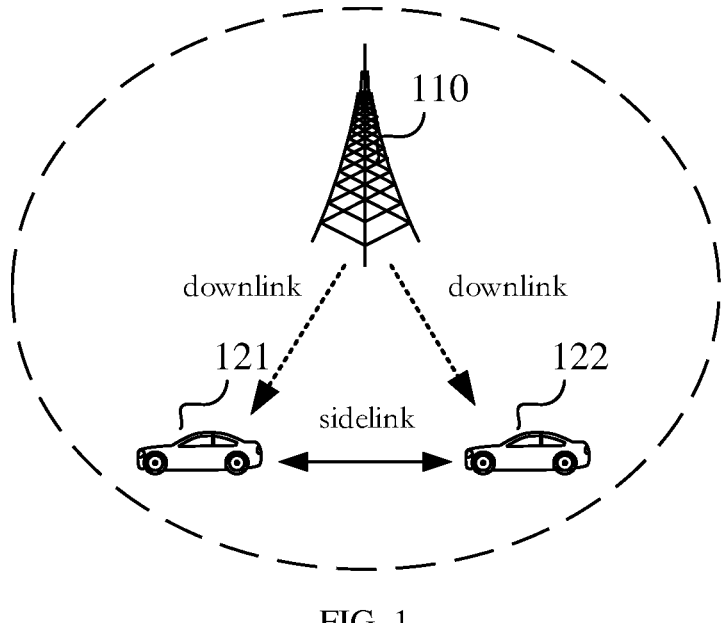
FIG. 1 is a schematic diagram of a communication system architecture provided by the present disclosure.

The technical solutions in embodiments of the present disclosure will be described below with reference to the drawings in the embodiments of the present disclosure. Obviously, the described embodiments are part of the embodiments of the present disclosure, but not all of the embodiments. With regard to the embodiments in the present disclosure, all other embodiments obtained by those of ordinary skill in the art without making creative efforts belong to the scope of protection of the present disclosure.

Technical solutions according to embodiments of the present disclosure can be applied to various communication systems, such as, Global System of Mobile communication (GSM) system, Code Division Multiple Access (CDMA) system, Wideband Code Division Multiple Access (WCDMA) system, General Packet Radio Service (GPRS), Long Term Evolution (LTE) system, Advanced Long Term Evolution (LTE-A) system, New Radio (NR) system, evolution system of NR system, LTE-based access to unlicensed spectrum (LTE-U) system, NR-based access to unlicensed spectrum (NR-U) system, Non-Terrestrial Networks (NTN) system, Universal Mobile Telecommunication System (UMTS), Wireless Local Area Networks (WLAN), Wireless Fidelity (WiFi), 5th-Generation (5G) system, or other communication systems, etc.

Generally speaking, traditional communication systems support a limited number of connections and are easy to implement. However, with the development of communication technologies, mobile communication systems will not only support traditional communications, but also support, for example, Device to Device (Device to Device, D2D) communications, Machine to Machine (M2M) communications, Machine Type Communication (MTC), Vehicle to Vehicle (V2V) communications, or Vehicle to everything (V2X), etc. Embodiments of the present disclosure can be applied to these communications systems.

Optionally, the communication systems in embodiments of the present disclosure may be applied to a Carrier Aggregation (CA) scenario, may also be applied to a Dual Connectivity (DC) scenario, and may also be applied to a standalone (SA) network deployment scenario.

Optionally, the communication system in embodiments of the present disclosure may be applied in unlicensed spectrum. The unlicensed spectrum may also be considered as shared spectrum. Or, the communication system in embodiments of the present disclosure can also be applied in licensed spectrum. The licensed spectrum may also be considered as non-shared spectrum.

Embodiments of the present disclosure are described in combination with a terminal device and a network device. The terminal device may also be called User Equipment (UE), access terminal, user unit, user station, mobile station, mobile terminal, remote station, remote terminal, mobile device, user terminal, terminal, wireless communication device, user agent or user device, etc.

The terminal device may be a station (ST) in a WLAN, a cellular phone, a cordless phone, a Session Initiation Protocol (SIP) phone, a Wireless Local Loop (WLL) station, or a Personal Digital Assistant (PDA) device, a handheld device with wireless communication capabilities, a computing device or other processing device connected to a wireless modem, a vehicle-mounted device, a wearable device, or a terminal device in a next-generation communication system, such as a terminal device in the NR network or a terminal device in a future evolved Public Land Mobile Network (PLMN) network.

In embodiments of the present disclosure, the terminal device may be deployed on land, including indoor or outdoor, handheld, wearable or vehicle-mounted: or, the terminal device may be deployed on water (such as on ships, etc.); or, the terminal device may be deployed in the air (such as on aircraft, balloons, and satellites, etc.).

In embodiments of the present disclosure, the terminal device may be a mobile phone, a tablet computer (Pad), a computer with wireless transceiver function, a virtual reality (VR) terminal device, an augmented reality (AR) terminal device, a wireless terminal device in industrial control, a wireless terminal device in self driving, a wireless terminal devices in remote medical, a wireless terminal device in smart grid, a wireless terminal device in transportation safety, a wireless terminal device in smart city, or a wireless terminal device in smart home, etc.

By way of example and not limitation, in embodiments of the present disclosure, the terminal device may also be a wearable device. The wearable device can also be referred to as a wearable smart device, which is a general term for applying wearable technology to intelligently design everyday wear and develop wearable devices, such as glasses, gloves, watches, clothing and shoes. A wearable device is a portable device that is worn directly on the body or integrated into users' clothes or accessories. The wearable device is not only a hardware device, but also realize powerful functions through software support, data interaction, and cloud interaction. Generalized wearable smart devices include full-featured and large-sized devices which can realize complete or partial functions that do not depend on smart phones, such as smart watches or smart glasses, and devices that only focus on a certain type of application functions, and need to cooperate with other devices like smart phones, such as smart bracelets for sign monitoring, or smart jewelry.

In embodiments of the present disclosure, the network device may be a device for communicating with a mobile device. The network device may be an Access Point (AP) in WLAN, a base station (BTS, Base Transceiver Station) in GSM or CDMA, or a base station (NB, NodeB) in WCDMA, an evolved base station in LTE (Evolutional Node B, eNB or eNodeB), or a relay station or an access point, or a vehicle-mounted device, a wearable device, a network device or a base station (gNB) in an NR network, or a network device in future evolved PLMN network or a network device in a NTN network.

By way of example and not limitation, in embodiments of the present disclosure, the network device may have mobile characteristics, for example, the network device may be a mobile device. Optionally, the network device may be a satellite, or a balloon station. For example, the satellite may be a Low Earth Orbit (LEO) satellite, a Medium Earth Orbit (MEO) satellite, a Geostationary Earth Orbit (GEO) satellite, or a High Elliptical Orbit (HEO) satellite, etc. Optionally, the network device may also be a base station deployed on land, or water, etc.

In embodiments of the present disclosure, the network device provides services for a cell, and the terminal device communicates with the network device through transmission resources (for example, frequency domain resources, or spectrum resources) used by the cell. The cell may be a cell corresponding to the network device (for example, base station). The cell may belong to a macro base station or a base station corresponding to a small cell. The small cell here may include: a metro cell, a micro cell, a pico cell, a femto cell, etc. These small cells have the characteristics of small coverage and low transmit power, and are suitable for providing high-speed data transmission services.

It should be understood that the terms "system" and "network" are often used interchangeably herein. The term "and/or" herein is only an association relationship to describe associated objects, indicating that there can be three kinds of relationships, for example, A and/or B can mean three cases: A alone, B alone, and A and B together. In addition, the character "/" herein generally indicates that the related objects after and before the character are in an "or" relationship.

Terms used in the embodiments of the present disclosure are only used to explain example embodiments of the present disclosure, and are not intended to limit the present disclosure. The terms "first", "second", "third" and "fourth" in the specification and claims of the present disclosure and the drawings are used to distinguish different objects, rather than to describe a specific order. Furthermore, the terms "include(s)" and "have/has", as well as any variations thereof, are intended to mean a non-exclusive inclusion.

It is to be understood that "indication/indicate" referred to in embodiments of the present disclosure may be a direct indication, an indirect indication, or representing an association relationship. For example, A indicates B can mean that A indicates B directly, for example, B may be obtained through A: or A indicates B can mean that A indicates B indirectly, for example, A indicates C and B may be obtained through C: or, A indicates B can mean that A and B have an association relationship.

In the description of embodiments of the present disclosure, the term "correspond/corresponding" may indicate a direct correspondence or indirect correspondence between two objects, or may indicate an association relationship between the two objects, or may be a relationship of indicating and being indicated, configuring and being configured, etc.

In embodiments of the present disclosure, "predefine/predefinition" may be realized by pre-saving a corresponding code, table or other methods that can be used to indicate related information in a device (for example, including a terminal device and a network device). The present disclosure does not limit its specific implementation. For example, the "predefine/predefinition" may refer to being defined in a protocol.

In embodiments of the present disclosure, a "protocol" may refer to a standard or a protocol in the communication field, for example, it may include an LTE protocol, an NR protocol, and related protocols applied to future communication systems, and the present disclosure does not impose any limitation on this.

FIG. 1 is a schematic diagram of a communication system to which the embodiments of the present disclosure are applicable. Transmission resource for vehicle-mounted terminals (vehicle-mounted terminals 121 and 122) are allocated by a base station 110, and the vehicle-mounted terminals transmit data on the sidelink according to the resources allocated by the base station 110. Specifically, the base station 110 may allocate resources for a single transmission to the terminals, or may allocate resources for semi-static transmission to the terminals.

Figure 2:
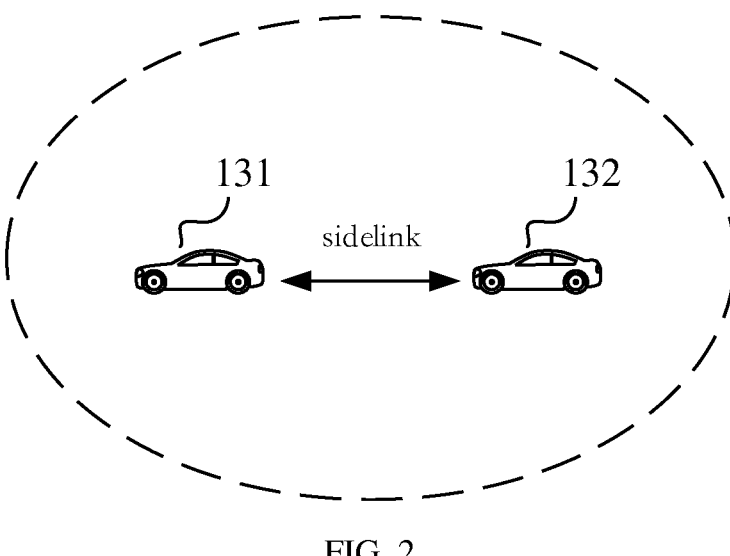
FIG. 2 is a schematic diagram of another communication system architecture provided by the present disclosure.

FIG. 2 is a schematic diagram of another communication system to which the embodiments of the present disclosure are applicable. Vehicle-mounted terminals (vehicle-mounted terminal 131 and vehicle-mounted terminal 132) autonomously select transmission resources from sidelink resources for data transmission. Optionally, the vehicle-mounted terminals may select transmission resources randomly, or select transmission resources by sensing.

Figure 3:
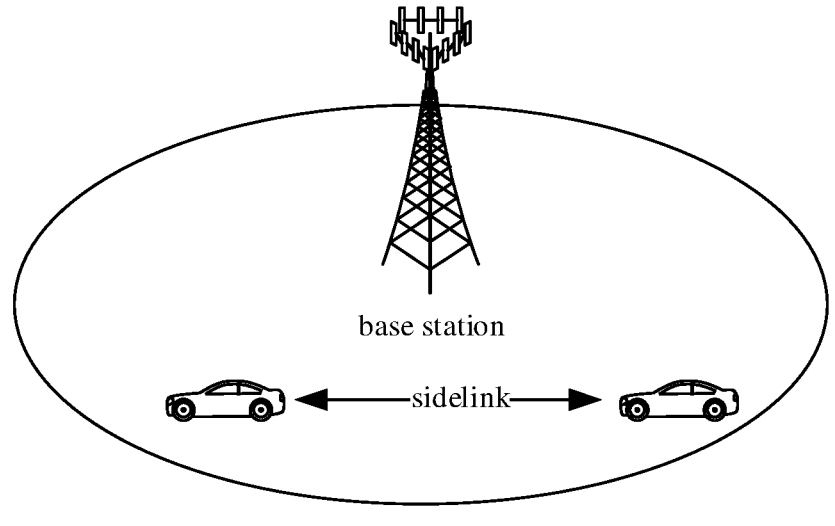
FIG. 3 is a schematic diagram of an in-coverage sidelink communication provided by the present disclosure.
Figure 4:
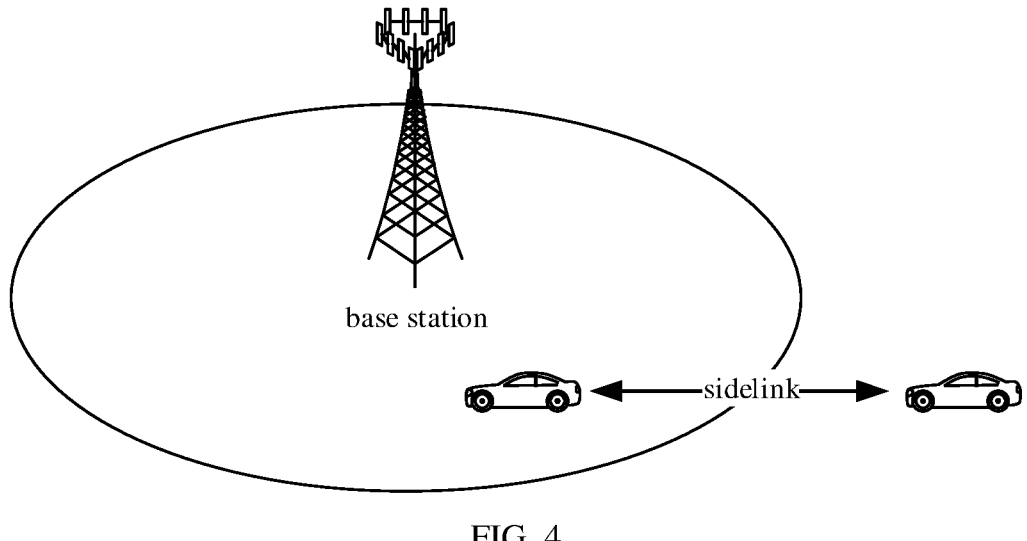
FIG. 4 is a schematic diagram of a partial coverage sidelink communication provided by the present disclosure.
Figure 5:
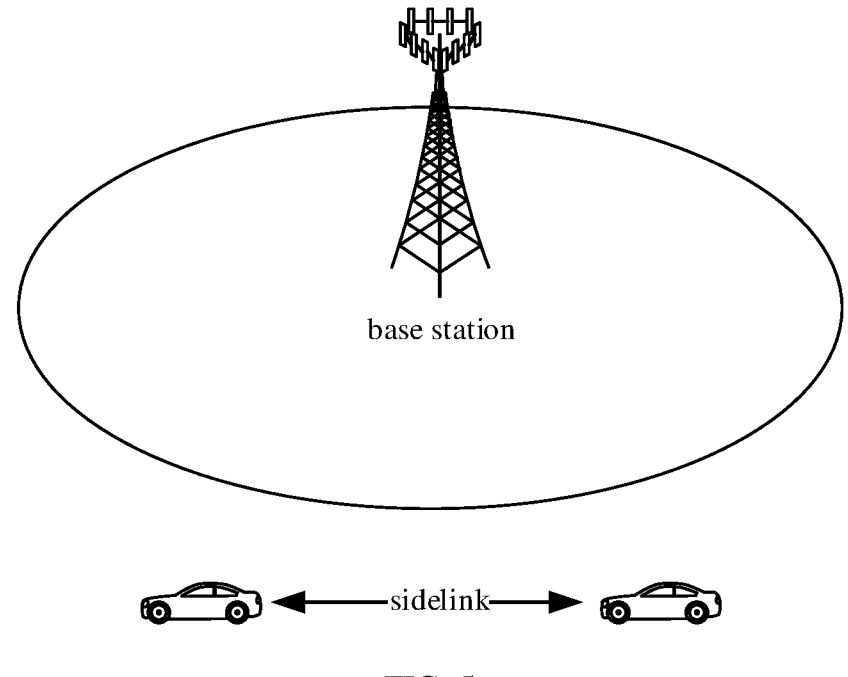
FIG. 5 is a schematic diagram of an out-of-coverage sidelink communication provided by the present disclosure.

It should be noted that, according to the network coverage situation where a terminal performing communications is located, the sidelink communications may be divided into: an in-coverage sidelink communication as shown in FIG. 3; a partial coverage sidelink communication as shown in FIG. 4; and an out-of-coverage sidelink communication as shown in FIG. 5.

As shown in FIG. 3: in the in-coverage sidelink communication, all terminals performing sidelink communications are within the coverage of the same base station, and thus all the terminals may receive configuration signaling from the base station to perform sidelink communications based on the same sidelink configuration.

As shown in FIG. 4: in the partial coverage sidelink communication, some terminals performing sidelink communications are located within the coverage of the base station. These terminals can receive configuration signaling of the base station, and perform sidelink communications according to the configuration of the base station. However, terminals located outside the coverage of the network cannot receive configuration signaling from the base station. In this case, the terminals outside the network coverage determine the sidelink configuration according to pre-configuration information and information carried in Physical Sidelink Broadcast Channel (PSBCH) sent by a terminal within the network coverage, and carry out sidelink communications.

As shown in FIG. 5: for the out-of-coverage sidelink communication, all terminals performing sidelink communications are located outside the network coverage, and all terminals determine sidelink configuration according to pre-configuration information to perform sidelink communications.

It should be noted that a terminal-to-terminal communication is a sidelink (SL) transmission technology based on Device to Device (D2D), and is different from a conventional cellular system in which communication data is received or sent through a base station. Thus, the terminal-to-terminal communication has higher spectral efficiency and lower transmission delay. The Internet of Vehicles system adopts a device to device direct communication method. Two transmission modes are defined in 3GPP, which are respectively referred to as: a first mode and a second mode. The embodiments of the present disclosure may be applied to the second mode.

First mode: a transmission resource for a terminal is allocated by a base station. The terminal transmits data on the sidelink according to the resource(s) allocated by the base station. The base station may allocate resource(s) for a single transmission to the terminal, or the base station may allocate resource(s) for semi-static transmission to the terminal. As shown in FIG. 3, a terminal is located within the coverage of the network, and the network allocates a transmission resource for sidelink transmission to the terminal.

Second mode: a terminal selects a resource from a resource pool for data transmission. As shown in FIG. 5, a terminal is located outside the coverage of the cell, and the terminal autonomously selects a transmission resource from a pre-configured resource pool for sidelink transmission. Or, as shown in FIG. 3, the terminal autonomously selects a transmission resource from a resource pool configured by the network to perform sidelink transmission.

It should be noted that in NR-V2X, a user may be in a mixed mode, that is, the user may use the first mode to obtain a resource, and may at the same time use the second mode to obtain a resource.

In NR-V2X, autonomous driving is supported, and thus higher requirements are placed on data interaction between vehicles, such as higher throughput, lower latency, higher reliability, greater coverage, more flexible resource allocation, etc.

Figure 6:
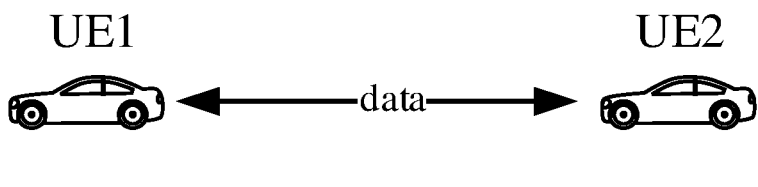
FIG. 6 is a schematic diagram of an unicast sidelink communication provided by the present disclosure.
Figure 7:
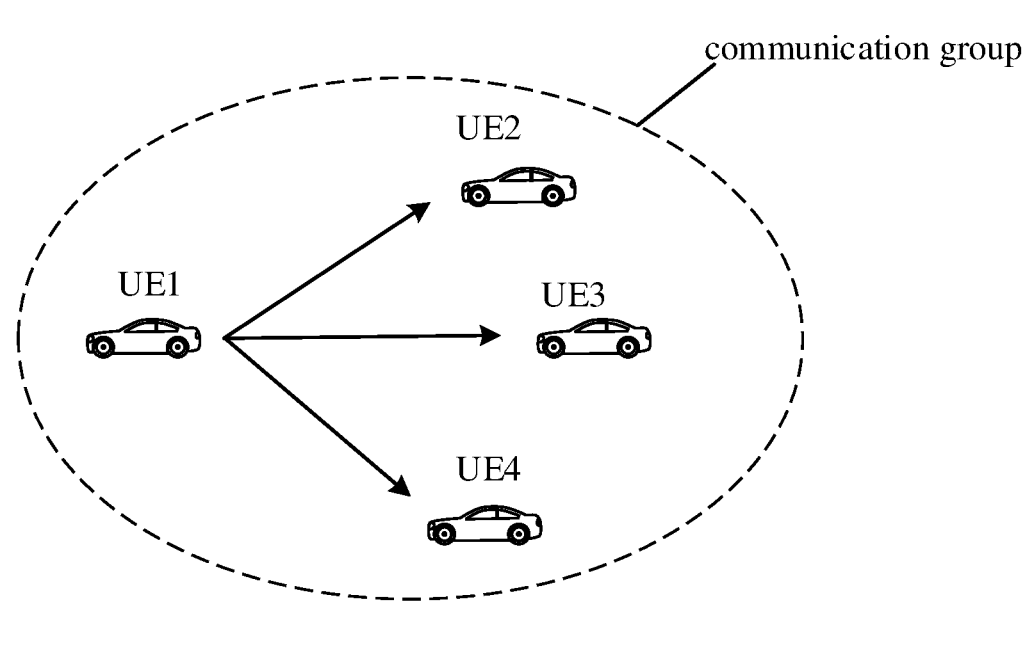
FIG. 7 is a schematic diagram of a groupcast sidelink communication provided by the present disclosure.
Figure 8:
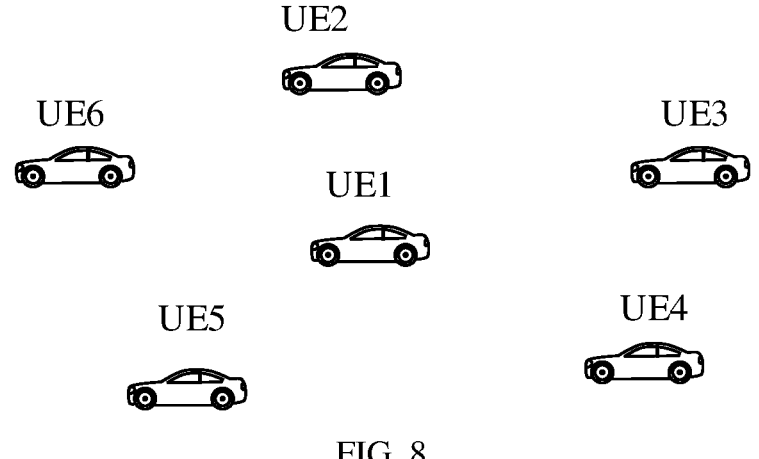
FIG. 8 is a schematic diagram of a broadcast sidelink communication provided by the present disclosure.

In LTE-V2X, a broadcast transmission mode is supported. In NR-V2X, a unicast transmission mode and a groupcast transmission mode are introduced. For a unicast transmission, there is only one terminal as the receiving terminal. As shown in FIG. 6, a unicast transmission is performed between UE1 and UE2. For a groupcast transmission, its receiving terminals are all terminals in a communication group, or all terminals within a certain transmission distance. As shown in FIG. 7, UE1, UE2, UE3 and UE4 form a communication group. UE1 transmits data, and other terminal devices in the group are all receiving terminals. For a broadcast transmission mode, the receiving terminal is any terminal around the transmitting terminal. As shown in FIG. 8, UE1 is a transmitting terminal, and other terminals around it (UE2-UE6) are all receiving terminals.

A resource pool is introduced in the sidelink transmission system. The so-called resource pool is a collection of transmission resources. Whether transmission resources are transmission resources configured by a network or transmission resources autonomously selected by a terminal, they are all resources in a resource pool. A resource pool may be configured through pre-configuration or network configuration, and one or more resource pools may be configured. Resource pools may be divided into a transmitting resource pool and a receiving resource pool. The transmitting resource pool means that transmission resources in the resource pool are used to transmit sidelink data: the receiving resource pool means that the terminal receives sidelink data on a transmission resource in the resource pool.

To facilitate a better understanding of the embodiments of the present disclosure, Sidelink Control Information (SCI) related to the present disclosure will be described.

Figure 9:
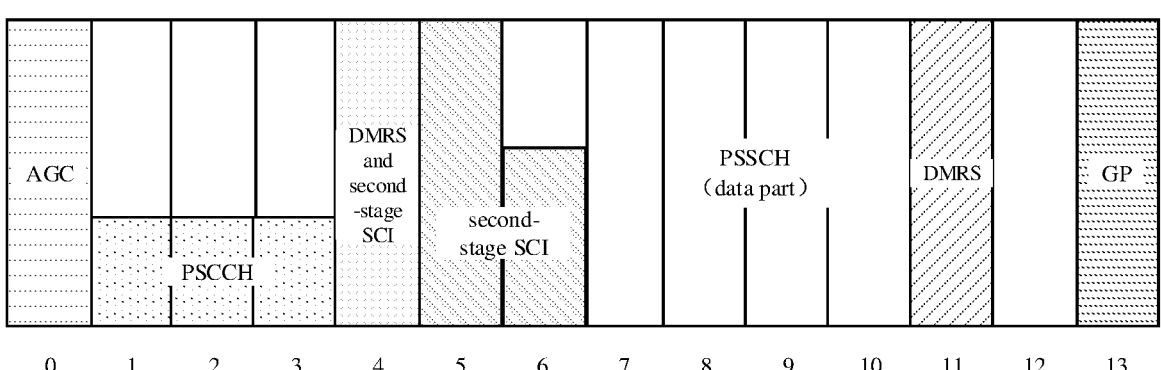
FIG. 9 is a schematic diagram of a PSCCH and PSSCH frame structure provided by the present disclosure.

In NR-V2X, a second-stage SCI is introduced. A first-stage SCI is carried in a Physical Sidelink Control Channel (PSCCH) to indicate a transmission resource of a Physical Sidelink Shared Channel (PSSCH), reserved resource information, Modulation and Coding Scheme (MCS) level, priority and so on. The second-stage SCI is transmitted in a resource of the PSSCH, is demodulated using Demodulation Reference Signal (DMRS) of the PSSCH, and is used to indicate a transmitting end identity (ID) (also called a source ID), a receiving end ID (also called a destination ID), a Hybrid Automatic Repeat reQuest (HARQ) ID, New Data Indicator (NDI) and/or other information used for data demodulation. The first symbol is usually used as an Auto Gain Control (AGC), the PSCCH starts from the second symbol of a slot, and the last symbol is used as a Guard Period (GP). The second-stage SCI is mapped from the first DMRS symbol of the PSSCH, first in the frequency domain and then in the time domain. As shown in FIG. 9, the PSCCH occupies three symbols (symbol 1, symbol 2, and symbol 3), and the DMRS of the PSSCH occupies symbol 4 and symbol 11, the second-stage SCI is mapped from symbol 4, and is frequency division multiplexed with DMRS on symbol 4. The second-stage SCI is mapped to symbol 4, symbol 5, and symbol 6. The resource size occupied by the second-stage SCI depends on the number of bits in the second-stage SCI.

In order to better understand the embodiments of the present disclosure, a Physical Sidelink Feedback Channel (PSFCH) related to the present disclosure will be described.

In version 16 (release 16, R16), NR-V2X supports sequence type PSFCH, called PSFCH format 0. This type of PSFCH occupies one Physical Resource Block (PRB) in the frequency domain and one Orthogonal frequency-division multiplexing (OFDM) symbol in the time domain, and uses the same sequence type as Physical Uplink Control Channel (PUCCH) format 0. In a resource pool, a PSFCH resource is configured with 1, 2 or 4 slots as a period, and in a slot where there exists a PSFCH resources, the PSFCH resource is located in the last OFDM symbol that can be used for sidelink transmission in the slot. However, in order to support switching between reception and transmission and AGC adjustment, there are two OFDM symbols before the PSFCH symbol for switching between reception and transmission and AGC adjustment, respectively. Furthermore, PSCCH and PSSCH transmissions are not allowed on the above three OFDM symbols. In R16 NR-V2X, PSFCH is only used to carry HARQ feedback information, and the capacity of one PSFCH is one bit.

A PSFCH transmission resource is determined according to a time-frequency position of its corresponding PSSCH transmission resource. In NR-V2X, the following two PSFCH resource determination methods are supported, and the specific method for determining PSFCH resource is configured according to higher-layer signaling.

Method 1: The PSFCH transmission resource is determined according to the first subchannel of a PSSCH frequency domain resource.

Mode 2: The PSFCH transmission resource is determined according to all subchannels occupied by the PSSCH frequency domain.

For the resource determination method 1, since the transmission resource of PSFCH is determined only according to the first subchannel occupied by PSSCH, no matter how many subchannels occupied by PSSCH, the corresponding number of feedback resource(s) of PSFCH is fixed. For method 2, the number of transmission resource(s) of PSFCH is determined according to the number of subchannels occupied by PSSCH, and therefore, the more subchannels occupied by PSSCH, the more transmission resources of PSFCH. Method 2 is more suitable for scenarios requiring more sidelink HARQ feedback resources, for example, the second type sidelink HARQ feedback mode in groupcast.

A corresponding PSFCH transmission resource set $$R_{PRB,CS}^{PSFCH}$$

may be determined according to the slot and subchannel for transmitting the PSSCH. The indexes of the PSFCH transmission resources in the resource set are determined first in an ascending order of Resource blocks (RBs) and then in an ascending order of Cyclic Shift (CS). Further, in this resource set, the transmission resource of PSFCH is determined by the following formula 1:

$$(P_{ID} + M_{ID}) \bmod R_{PRB,CS}^{PSFCH} \qquad \text{Formula 1}$$

where $P_{ID}$ represents the transmitting end identity (ID) information, that is, the source ID of the transmitter UE carried in the SCI: for unicast or NACK-only groupcast sidelink HARQ feedback mode, $M_{ID}=0$: for Acknowledgment (ACK)/Negative Acknowledgment (NACK) groupcast sidelink HARQ feedback mode, $M_{ID}$ represents an in-group identity of the receiver UE configured by a higher layer.

In NR-V2X, a PSFCH resource is configured by R16 sidelink PSFCH configuration (SL-PSFCH-Config-r16) signaling, where PSFCH period (sl-PSFCH-Period-r16) is used to configure the period of a PSFCH resource, PSFCH RB set (sl-PSFCH-RB-Set-r16) is used to configure a PRB that can be used for PSFCH transmission on an OFDM symbol where the PSFCH resource is located, and the number of cyclic shift pairs (sl-NumMuxCS-Pair-r16) is used to configure the allowed number of cyclic shift pairs of the PFSCH sequence in one PRB, the minimum time interval of PSFCH (sl-MinTimeGapPSFCH-r16) is used to configure the minimum time interval of PSFCH and its associated PSSCH, the frequency hopping ID of PSFCH (sl-PSFCH-HopID-r16) is used to configure the frequency hopping ID of PSFCH, the ID is used to determine the sequence of PSFCH, and the candidate resource type of PSFCH (sl-PSFCH-CandidateResourceType-r16) is used to configure the manner to determine the candidate resource(s) of PSFCH.

In order to better understand embodiments of the present disclosure, the resource allocation enhancement in NR-V2X related to the present disclosure will be described.

Figure 10:
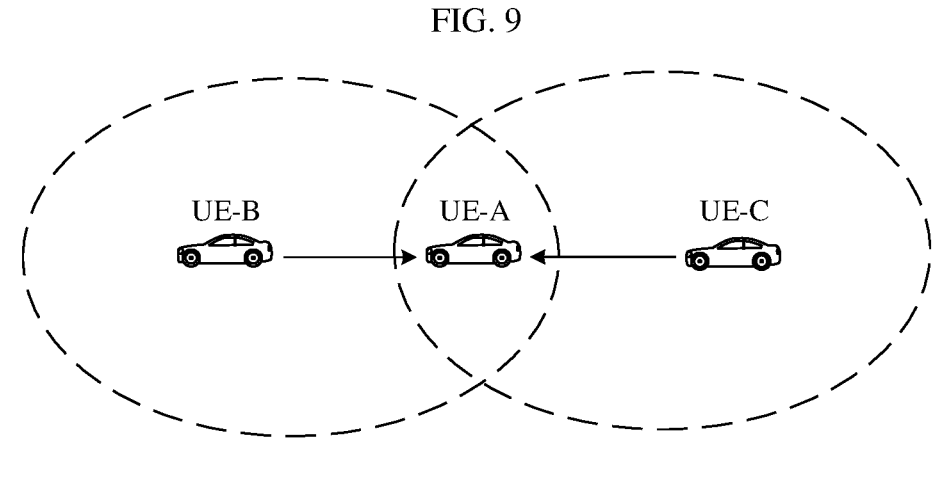
FIG. 10 is a schematic diagram of a hidden node provided in the present disclosure.

In the transmission method of the second mode described above, a terminal device randomly selects a transmission resource in a resource pool, or selects a transmission resource according to a sensing result. This resource selection method can avoid interference between terminals to a certain extent, but there are still problems as described below:

1. Hidden node: As shown in FIG. 10, UE-B selects a resource according to a sensing result, and uses the resource to transmit sidelink data to UE-A. Since UE-B and UE-C are far away from each other and they cannot sense each other's transmission, UE-B and UE-C may select the same transmission resource, and thus the data transmitted by UE-C will interfere with the data transmitted by UE-B. This is the hidden node problem.

2. Half-duplex issue: When a terminal select a transmission resource through sensing, within a sensing window, if the terminal transmits sidelink data on a certain slot, the terminal cannot receive data transmitted by other terminals in this slot due to half-duplex restriction, and there is no sensing result. Therefore, when the terminal performs resource exclusion, it will exclude all resources corresponding to the slot in a selection window to avoid interference with other terminals. Due to the half-duplex restriction, the terminal excludes many resources that do not need to be excluded.

Figure 11:
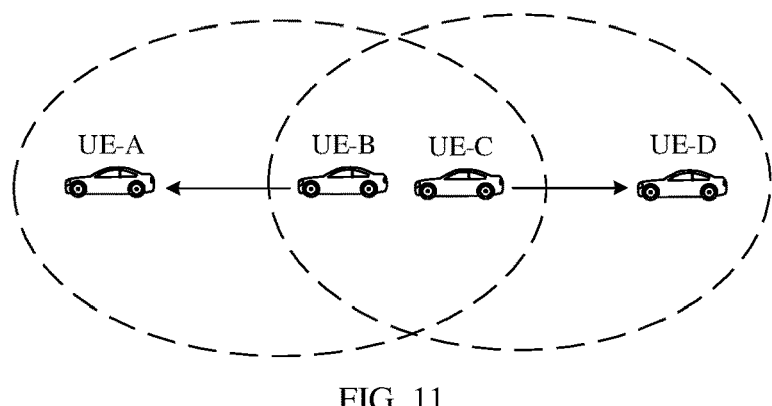
FIG. 11 is a schematic diagram of an exposed node provided by the present disclosure.

3. Exposed terminal issue: As shown in FIG. 11, both the transmitter UE-B and the transmitter UE-C can sense each other, but the target receiver UE-A of the transmitter UE-B is far away from the transmitter UE-C, and the target receiver UE-D is far away from the transmitter UE-B. In this case, even if the transmitter UE-B and the transmitter UE-C use the same time-frequency resources, they will not affect the reception of their respective target receiving terminals. However, due to the close geographical locations of the two parties, during the sensing procedure, the detected signal reception power of the other party may be very high, and thus the two parties will select orthogonal time-frequency resources, which may eventually lead to a decrease in resource utilization efficiency.

4. Power consumption problem: In the above sensing procedure, a terminal needs to continuously perform resource sensing to determine which resource is available, and the continuous resource sensing of the terminal needs to consume a lot of energy. This is not a problem for a vehicle-mounted terminal, because the vehicle-mounted terminal has power supply equipment. But, for a handheld terminal, the excessive energy consumption will cause the terminal to run out of power soon. Therefore, how to reduce the energy consumption of a terminal is also a problem that needs to be considered in the resource selection procedure.

Due to the problems existing in the resource selection procedure in the second transmission mode, an enhanced resource selection scheme is proposed. On the basis of the resource sensing adopted in the second transmission mode, a reference resource set may be transmitted by one terminal (UE-A) to another terminal (UE-B) to assist UE-B in resource selection. The reference resource set may be obtained by the UE-A according to a resource sensing result, or base station indication, and so on to obtain an available resource set, or may be determined according to detected SCI. The reference resource set may be a resource set suitable for use by UE-B. When UE-B selects a resource for transmitting sidelink data to a target receiving terminal, UE-B may preferentially select the resource from the available resource set, thereby improving the reliability for the receiving terminal to receive the sidelink data. Or, the resource set may also be a resource set that is not suitable for UE-B, and UE-B avoids selecting a resource in the resource set when performing resource selection, thereby avoiding hidden terminal, half-duplex restriction, etc. The terminal undertaking the UE-A function is called a resource coordinator terminal.

Compared with the existing method in which a terminal autonomously selects a transmission resource in the second mode, in the above resource allocation method, the terminal performs resource selection in combination with the reference resource set transmitted by another terminal during the resource selection procedure, thereby improving transmission reliability.

In the above enhanced resource selection scheme, in some cases UE-A needs to transmit the reference resource set to UE-B. In the above procedure, as to what physical channel or physical resource UE-A uses to transmit the reference resource set, there is currently no solution.

In view of the above problem(s), the present disclosure proposes a method.

The technical solutions of the present disclosure are described in detail below through specific examples.

Figure 12:
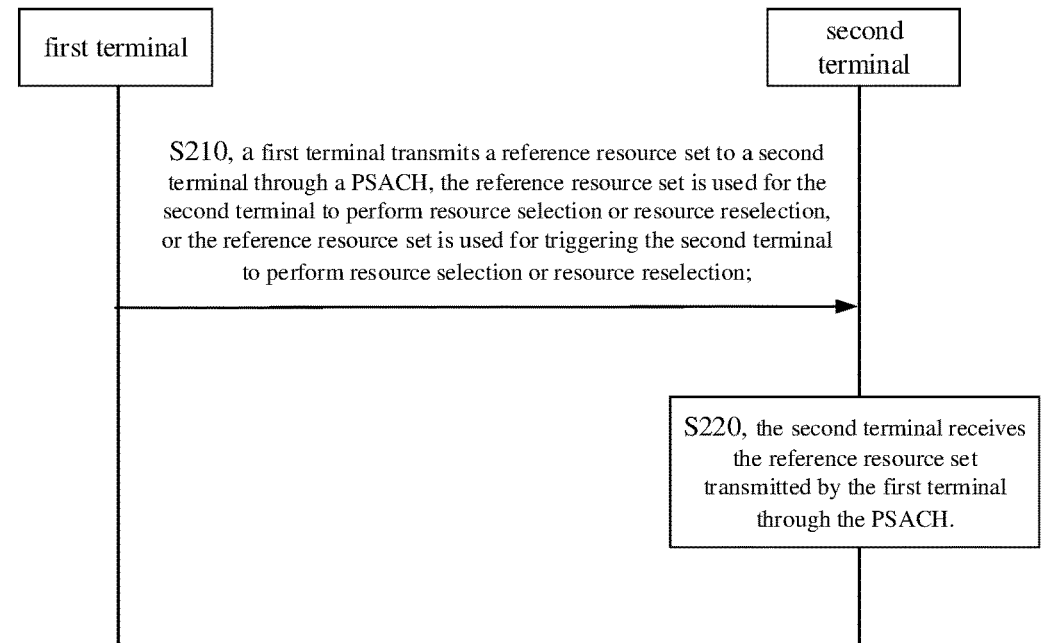
FIG. 12 is a schematic flowchart of a wireless communication method according to an embodiment of the present disclosure.

FIG. 12 is a schematic flowchart of a wireless communication method 200 according to an embodiment of the present disclosure. As shown in FIG. 12, the method 200 may include at least part of the following content:

In S210, a first terminal transmits a reference resource set to a second terminal through a PSACH. The reference resource set is used for the second terminal to perform resource selection or resource reselection, or the reference resource set is used for triggering the second terminal to perform resource selection or resource reselection.

In S220, the second terminal receives the reference resource set transmitted by the first terminal through the PSACH.

In an embodiment of the present disclosure, in a certain condition, the first terminal needs to transmit the reference resource set to the second terminal, and the first terminal may transmit the reference resource set to the second terminal by using a physical channel in sequence format. The certain condition may be based on, for example, receiving trigger signaling transmitted by the second terminal through a Physical Sidelink Triggering Channel (PSTCH). The trigger signaling may be used to trigger the first terminal to transmit the reference resource set to the second terminal. Alternatively, the certain condition may be determining that a resource already used by the second terminal or a resource reserved in the future has relatively high interference or half-duplex restriction. In the embodiments of the present disclosure, the physical channel in sequence format used to carry the reference resource set is a Physical Sidelink Assistant Channel (PSACH). Of course, the physical channel may also be a physical channel in other sequence format, and embodiments of the present disclosure do not impose specific limitation on this.

Optionally, in some embodiments, the first terminal determines a PRB set available for PSACH transmission.

Optionally, the period of the PRB set available for PSACH transmission in a resource pool is the same as the period of the PRB set available for PSFCH transmission in the resource pool. In each period of the PRB set available for PSACH transmission, a slot where the PSACH resource set is located is the same as a slot where the PSFCH in this period is located, and in this slot, the PRB set available for PSACH transmission is located at the last two OFDM symbols available for sidelink. However, on the above OFDM symbols, a PRB for PSACH and a PRB for PSFCH are configured by different higher layer parameters. For example, at least one PRB included in the PRB set used for PSACH transmission is different or at least partly different from at least one PRB included in the PRB set used for PSFCH transmission.

Optionally, the PRB set available for PSACH transmission in a resource pool is located at the last OFDM symbol that can be used for sidelink communication in each slot, that is, it is located in the last guard period (GP) symbol in the slot that can be used for sidelink. For example, in this case, all PRBs within a guard period (GP) symbol can be used for PSACH transmission.

That is, the PRB set available for PSACH transmission in a resource pool is located in the last OFDM symbol available for sidelink communication in each slot. Optionally, the PRB set used for PSACH transmission in one slot includes all PRBs in the last OFDM symbol available for sidelink communication.

Optionally, the period of the PRB set available for PSACH transmission in a resource pool is the same as the period of the PRB set available for PSFCH transmission in the resource pool. In each period of the PRB set available for PSACH transmission, a slot where the PSACH resource set is located is the same as the slot where the PSFCH in this period is located, and in this slot, the PRB set available for PSACH transmission is located at the last two OFDM symbols available for sidelink. Moreover, on the above OFDM symbols, at least one PRB included in the PRB set used for PSACH transmission is the same as at least one PRB included in the PRB set used for PSFCH transmission.

In embodiments of the present disclosure, if the first terminal transmits the reference resource set through PSACH according to the received trigger signaling transmitted by the second terminal, and the second terminal transmits the trigger signaling through a physical channel (such as PSTCH) in the same sequence format as the PSACH, the PRB set used for PSACH transmission may be the same as or associated one-to-one with the PRB set used for PSTCH transmission. If the first terminal transmits the reference resource set through the PSACH according to the received trigger signaling of the second terminal, but the second terminal transmits the trigger signaling through a PSCCH or PSSCH, or if the first terminal transmits the reference resource set in a case that the first terminal determines that the resource(s) already used by the second terminal or the resource(s) reserved in the future has (have) high interference or half-duplex restriction, and at this time, the PRB set for transmitting PSTCH is configured in the resource pool, it is preferable that the PRB set for PSACH transmission and the PRB set for PSTCH transmission are configured by different higher layer parameters.

Optionally, in some embodiments, the first terminal determines a transmission resource for the PSACH.

Optionally, the transmission resource for the PSACH may include a time domain resource and a frequency domain resource. The time domain resource may include a slot and/or an OFDM symbol, for example. The frequency domain resource may include a PRB, for example. In addition, the transmission resource for the PSACH may also include a code domain resource, that is, a cyclic shift of a sequence. For example, for a sequence using a specific cyclic shift in one PRB, the cyclic shift is applied to a specific root sequence.

Optionally, the root sequence used for transmitting the PSACH may be determined by the following formula 2:

$$r_u(n) = e^{j\phi(n)\pi/4}, \ 0 \le n \le M_{ZC} - 1 \qquad \text{Formula 2}$$

Where $M_{ZC}$ is equal to 12, and $M_{ZC}$ represents the length of the root sequence, and the value of $\phi$ (n) is shown in Table 1, $u = n_{ID} \bmod 30$. In an optional implementation, the root sequence used for transmitting the PSACH is the same as the root sequence used for transmitting the PSFCH in the resource pool, that is, $n_{ID}$ is a value indicated by a PSFCH frequency modulation identifier (sl-PSFCH-HopID-r16). In another optional implementation, the root sequence used for transmitting PSACH and the root sequence used for transmitting PSTCH in the resource pool may be different, that is, $n_{ID}$ is a value indicated by another Radio Resource Control (RRC) signaling different from sl-PSFCH-HopID-r16.

TABLE 1

| u | φ(0), . . . , φ(11) | | | | | | | | | | | |
|---|----|----|----|----|----|----|----|----|----|----|----|----|
| 0 | -3 | 1 | -3 | -3 | -3 | 3 | -3 | -1 | 1 | 1 | 1 | -3 |
| 1 | -3 | 3 | 1 | -3 | 1 | 3 | -1 | -1 | 1 | 3 | 3 | 3 |
| 2 | -3 | 3 | 3 | 1 | -3 | 3 | -1 | 1 | 3 | -3 | 3 | -3 |
| 3 | -3 | -3 | -1 | 3 | 3 | 3 | -3 | 3 | -3 | 1 | -1 | -3 |
| 4 | -3 | -1 | -1 | 1 | 3 | 1 | 1 | -1 | 1 | -1 | -3 | 1 |
| 5 | -3 | -3 | 3 | 1 | -3 | -3 | -3 | -1 | 3 | -1 | 1 | 3 |
| 6 | 1 | -1 | 3 | -1 | -1 | -1 | -3 | -1 | 1 | 1 | 1 | -3 |
| 7 | -1 | -3 | 3 | -1 | -3 | -3 | -3 | -1 | 1 | -1 | 1 | -3 |
| 8 | -3 | -1 | 3 | 1 | -3 | -1 | -3 | 3 | 1 | 3 | 3 | 1 |
| 9 | -3 | -1 | -1 | -3 | -3 | -1 | -3 | 3 | 1 | 3 | -1 | -3 |
| 10 | -3 | 3 | -3 | 3 | 3 | -3 | -1 | -1 | 3 | 3 | 1 | -3 |
| 11 | -3 | -1 | -3 | -1 | -1 | -3 | 3 | 3 | -1 | -1 | 1 | -3 |
| 12 | -3 | -1 | 3 | -3 | -3 | -1 | -3 | 1 | -1 | -3 | 3 | 3 |
| 13 | -3 | 1 | -1 | -1 | 3 | 3 | -3 | -1 | -1 | -3 | -1 | -3 |
| 14 | 1 | 3 | -3 | 1 | 3 | 3 | 3 | 1 | -1 | 1 | -1 | 3 |
| 15 | -3 | 1 | 3 | -1 | -1 | -3 | -3 | -1 | -1 | 3 | 1 | -3 |
| 16 | -1 | -1 | -1 | -1 | 1 | -3 | -1 | 3 | 3 | -1 | -3 | 1 |
| 17 | -1 | 1 | 1 | -1 | 1 | 3 | 3 | -1 | -1 | -3 | 1 | -3 |

TABLE 1-continued

| u | φ(0), . . . , φ(11) | | | | | | | | | | | |
|---|---|---|---|---|---|---|---|---|---|---|---|---|
| 18 | −3 | 1 | 3 | 3 | −1 | −1 | −3 | 3 | 3 | −3 | 3 | −3 |
| 19 | −3 | −3 | 3 | −3 | −1 | 3 | 3 | 3 | −1 | −3 | 1 | −3 |
| 20 | 3 | 1 | 3 | 1 | 3 | −3 | −1 | 1 | 3 | 1 | −1 | −3 |
| 21 | −3 | 3 | 1 | 3 | −3 | 1 | 1 | 1 | 1 | 3 | −3 | 3 |
| 22 | −3 | 3 | 3 | 3 | −1 | −3 | −3 | −1 | −3 | 1 | 3 | −3 |
| 23 | 3 | −1 | −3 | 3 | −3 | −1 | 3 | 3 | 3 | −3 | −1 | −3 |
| 24 | −3 | −1 | 1 | −3 | 1 | 3 | 3 | 3 | −1 | −3 | 3 | 3 |
| 25 | −3 | 3 | 1 | −1 | 3 | 3 | −3 | 1 | −1 | 1 | −1 | 1 |
| 26 | −1 | 1 | 3 | −3 | 1 | −1 | 1 | −1 | −1 | −3 | 1 | −1 |
| 27 | −3 | −3 | 3 | 3 | 3 | −3 | −1 | 1 | −3 | 3 | 1 | −3 |
| 28 | 1 | −1 | 3 | 1 | 1 | −1 | −1 | −1 | 1 | 3 | −3 | 1 |
| 29 | −3 | 3 | −3 | 3 | −3 | −3 | 3 | −1 | −1 | 1 | 3 | −3 |

Optionally, the first terminal may specifically determine the transmission resource for the PSACH through the following methods 1 to 4. The PRB used for transmitting the PSACH belongs to the PRB set used for PSACH transmission determined by the first terminal.

Method 1: the first terminal determines the transmission resource for the PSACH according to a time-frequency resource position of a first PSSCH transmitted by the second terminal.

Figure 13:
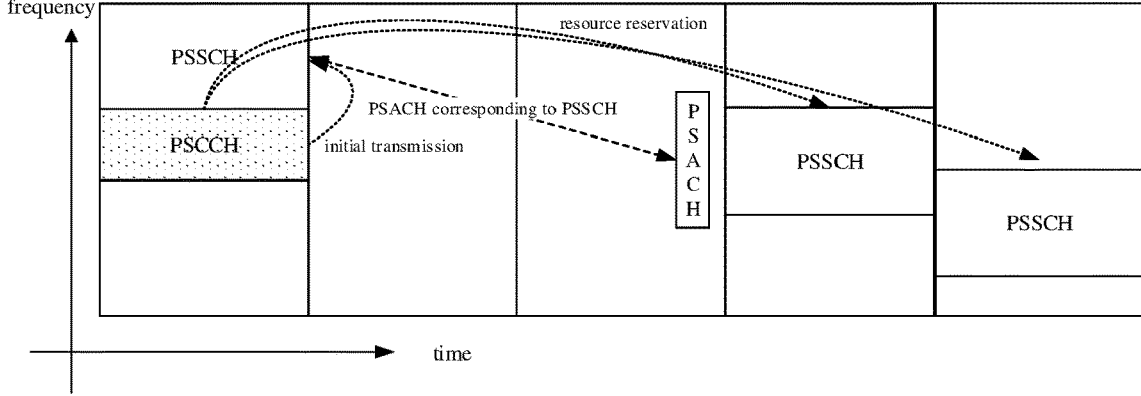
FIG. 13 is a schematic diagram of a corresponding relationship between a PRB used for transmitting a PSACH and a PSSCH used for indicating a reserved resource and scheduled by a PSCCH provided by an embodiment of the present disclosure.

In method 1, at least one resource in the reference resource set transmitted by the first terminal corresponds to one or more reserved resources indicated by the second terminal. For example, the reference resource set contains at most N resources used for PSCCH and/or PSSCH transmission, corresponding to N reserved resources indicated by the second terminal most recently through a PSCCH for scheduling the first PSSCH, and N is a positive integer, and N≤2. For another example, the reference resource set contains at most M resources used for PSCCH and/or PSSCH transmission, corresponding to M reserved resources indicated by the second terminal most recently through signaling (such as the first PSSCH) other than PSCCH, M is a positive integer. In this case, the first terminal determines the transmission resource for the PSACH according to the time-frequency resource position of the first PSSCH transmitted by the second terminal. For example, the first PSSCH transmitted by the second terminal is the PSSCH used by the second terminal to indicate the N reserved resources and scheduled by the PSCCH. For example, a corresponding relationship between the PRB used for transmitting the PSACH and the PSSCH used to indicate the reserved resources and scheduled by the PSCCH may be as shown in FIG. 13, or the first PSSCH is the PSSCH used to indicate the M reserved resources.

That is to say, the reference resource set includes N resources used for PSCCH and/or PSSCH transmission, and the N resources correspond to the N reserved resources indicated by the second terminal through the PSCCH for scheduling the first PSSCH, N is a positive integer, and N≤2: or, the reference resource set includes M resources used for PSCCH and/or PSSCH transmission, and the M resources correspond to the M reserved resources indicated by the second terminal through the first PSSCH, M is a positive integer.

In method 1, for example, if the first PSSCH is located in a time unit n, the first terminal determines that the PSACH carrying the reference resource set is transmitted on the PSACH resource on a time unit m, wherein the time interval between n and m is not smaller than a first threshold. The time unit includes a symbol and/or a slot. In addition, there is a PSACH resource on the time unit m.

Optionally, the first threshold may be pre-configured or specified by a protocol, or the first threshold is configured or indicated by the network device. In addition, the first threshold may be 0, that is, the interval between n and m may be 0.

Optionally, a PRB for the PSACH corresponding to one subchannel in one slot may be as shown in formula 3.

$$\left[\left(i + j \cdot N^{PSACH}\right) \cdot M^{PSACH}_{subch,slot}, \left(i + 1 + j \cdot N^{PSACH}\right) \cdot M^{PSACH}_{subchs,lot} - 1\right] \quad \text{Formula 3}$$

where $$M^{PSACH}_{subch,slot}$$

represents the number or PRBs for the PSACH corresponding to one subchannel in one slot, and $N^{PSACH}$ represents the period of a PSACH resource. The start of a PSSCH is located at slot i, and slot i occupies one or more subchannels from a j-th subchannel, $0 \leq i < N^{PSACH}$, $0 \leq j < N_{subch}$, $N_{subch}$ represents the number of subchannels included in the resource pool used by the first terminal.

Optionally, the number of PRBs for the PSACH corresponding to one subchannel in one slot is determined according to the following formula 4:

$$M^{PSACH}_{subch,slot} = M^{PSACH}_{PRBset} / \left(N_{subch} \cdot N^{PSACH}\right) \quad \text{Formula 4}$$

where $$M^{PSACH}_{subch,slot}$$

indicates the number of PRBs for the PSACH corresponding to one subchannel in one slot, $$M^{PSACH}_{PRB,set}$$

indicates the number of PRBs configured for PSACH transmission, $N_{subch}$ indicates the number of PSSCH subchannels included in the resource pool used by the first terminal, and N PSACH indicates the period of the PSACH resource.

It should be noted that, in method 1, the one slot in the above formula 3 and formula 4 is the slot where the first PSSCH is located.

Optionally, in method 1, the first terminal may specifically determine the PRB used for transmitting the PSACH from at least one PRB:

the at least one PRB is at least one PRB for the PSACH corresponding to one subchannel in the slot where the first PSSCH is located.

That is, the at least one PRB is at least one PRB for the PSACH corresponding to one subchannel in the slot where the first PSSCH is located as determined according to formula 3 above.

Optionally, in an implementation, the first terminal determines the PRB used for transmitting the PSACH from the at least one PRB according to a source terminal identity indicated in SCI for scheduling the first PSSCH.

For example, the first terminal determines the PRB used for transmitting the PSACH from the at least one PRB according to the following formula 5:

$$P_{ID} \bmod M_{subch,slot}^{PSACH} \qquad \text{Formula 5}$$

wherein Pup indicates the source terminal identity indicated in the SCI for scheduling the first PSSCH, $$M_{subch,slot}^{PSACH}$$

indicates the number of PRB(s) for the PSACH corresponding to one subchannel in one slot, that is, $$M_{subch,slot}^{PSACH}$$

indicates the at least one PRB.

Optionally, in another implementation, the first terminal determines the PRB used for transmitting the PSACH from the at least one PRB according to the source terminal identity indicated in the SCI for scheduling the first PSSCH and the member identity of the first terminal.

For example, in a case where the reference resource set includes two resources reserved by the second terminal, the first terminal determines the cyclic shift for transmitting the PSACH according to the following formula 7:

$$\alpha = \frac{2\pi}{N_{SC}^{RB}}\left(\left(m_0 + m_{cs} + n_{cs}\left(n_{s,f'}^{\mu}\right)\right) \bmod N_{SC}^{RB}\right) \qquad \text{Formula 7}$$

where $m_{cs}$ is a parameter determined according to the state of each resource in the reference resource set, $$n_{cs}\left(n_{s,f'}^{\mu}\right)$$

is a random number determined according to a transmission slot and a transmission symbol for the PSACH, and $$N_{SC}^{RB}$$

is the number of subcarriers in one RB.

It should be noted that $m_0$ in formula 7 is pre-configured or specified by a protocol, or configured by a network device, that is, $m_0$ is a known parameter. In addition, the value of $m_{cs}$ in formula 7 may be determined according to Table 2 below.

TABLE 2

| states of two resources | {not suitable for transmission by the second terminal, not suitable for transmission by the second terminal} | {not suitable for sending by the second terminal, suitable for transmission by the second terminal} | {suitable for transmission by the second terminal, suitable for transmission by the second terminal} | {suitable for transmission by the second terminal, not suitable for transmission by the second terminal} |
|---|---|---|---|---|
| $m_{cs}$ | $m_{CS} = 0$ | $m_{CS} = 3$ | $m_{CS} = 6$ | $m_{CS} = 9$ |

For example, the first terminal determines the PRB used for transmitting the PSACH from the at least one PRB according to the following formula 6:

$$(P_{ID} + M_{ID}) \bmod M_{subch,slot}^{PSACH} \qquad \text{Formula 6}$$

where $P_{ID}$ indicates the source terminal identity indicated in the SCI for scheduling the first PSSCH, $M_{ID}$ indicates the member identity of the first terminal, $$M_{subch,slot}^{PSACH}$$

indicates the number of PRB(s) for the PSACH corresponding to one subchannel in one slot, that is, $$M_{subch,slot}^{PSACH}$$

indicates the at least one PRB.

Optionally, in method 1, the first terminal determines a cyclic shift for transmitting the PSACH according to the number of at least one resource in the reference resource set and the state of each resource in the reference resource set.

Optionally, in Method 1,

The first terminal determines at least one cyclic shift group according to the number of at least one PRB for the PSACH corresponding to the subchannel in the slot where the first PSSCH is located and the number of cyclic shift groups allowed for each PRB available for PSACH transmission:

the first terminal determines a cyclic shift group for transmitting the PSACH from the at least one cyclic shift group according to a source terminal identity indicated in SCI used for scheduling the first PSSCH; and the first terminal determine a cyclic shift for transmitting the PSACH from the cyclic shift group for transmitting the PSACH according to a state of each resource in the reference resource set.

For example, the first terminal may determine the at least one cyclic shift group according to the following formula 8:

$$M_{subch,slot}^{PSACH} \times N_{CS}^{PSACH} \qquad \text{Formula 8}$$

wherein $$M_{subch,slot}^{PSACH}$$

represents the number of PRB(s) for the PSACH corresponding to one subchannel in one slot, and $$N_{CS}^{PSACH}$$

represents the number of cyclic shift groups allowed for each PRB available for PSACH transmission.

It should be noted that the one slot in formula 8 may be the slot where the first PSSCH is located.

For example, the first terminal may determine the cyclic shift group for transmitting the PSACH from the at least one cyclic shift group according to the following formula 9:

$$P_{ID} \bmod M_{subch,slot}^{PSACH} \times N_{CS}^{PSACH} \qquad \text{Formula 9}$$

wherein Pp represents the source terminal identity indicated in the SCI for scheduling the first PSSCH, and $$M_{subch,slot}^{PSACH} \times N_{CS}^{PSACH}$$

represents the at least one cyclic shift group.

Optionally, in Method 1:

the first terminal determines at least one cyclic shift group according to the number of at least one PRB for the PSACH corresponding to the subchannel in the slot where the first PSSCH is located and the number of $$(P_{ID} + M_{ID}) \bmod M_{subch,slot}^{PSACH} \times N_{CS}^{PSACH} \qquad \text{Formula 10}$$

wherein $P_{ID}$ represents the source terminal identity indicated in the SCI for scheduling the first PSSCH, $M_{ID}$ represents the member identity of the first terminal, and $$M_{subch,slot}^{PSACH} \times N_{CS}^{PSACH}$$

represents the at least one cyclic shift group.

Optionally, in a case where the reference resource set includes 2 resources reserved by the second terminal and there are 2 cyclic shift groups in each PRB, the first terminal determines the cyclic shift α for transmitting the PSACH according to the following formula 11:

$$\alpha = \frac{2\pi}{N_{SC}^{RB}} \left( \left( m_{cs} + n_{cs}(n_{s,f}^{\mu}, l') \right) \bmod N_{SC}^{RB} \right) \qquad \text{Formula 11}$$

wherein $m_{cs}$ is a parameter determined according to the state of each resource in the reference resource set, $$n_{cs}\left(n_{s,f}^{\mu}, l'\right)$$

is a random number determined according to a transmission slot and a transmission symbol for the PSACH, and $$N_{SC}^{RB}$$

is the number of subcarriers in one RB.

It should be noted that the value of $m_{cs}$ in formula 11 may be determined according to Table 3 below.

TABLE 3

| states of two resources | {not suitable for transmission by the second terminal, not suitable for transmission by the second terminal} | {not suitable for transmission by the second terminal, suitable for transmission by the second terminal} | {suitable for transmission by the second terminal, suitable for transmission by the second terminal} | {suitable for transmission by the second terminal, not suitable for transmission by the second terminal} |
|---|---|---|---|---|
| first cyclic shift group $m_{cs}$ | $m_{CS} = 0$ | $m_{CS} = 3$ | $m_{CS} = 6$ | $m_{CS} = 9$ |
| second cyclic shift group $m_{cs}$ | $m_{CS} = 1$ | $m_{CS} = 4$ | $m_{CS} = 7$ | $m_{CS} = 8$ | cyclic shift groups allowed for each PRB available for PSACH transmission;

the first terminal determines a cyclic shift group for transmitting the PSACH from the at least one cyclic shift group according to a member identity of the first terminal and a source terminal identity indicated in SCI used for scheduling the first PSSCH; and the first terminal determines a cyclic shift for transmitting the PSACH from the cyclic shift group for transmitting the PSACH according to a state of each resource in the reference resource set.

For example, the first terminal may determine the cyclic shift group for transmitting the PSACH from the at least one cyclic shift group according to the following formula 10:

Method 2: the first terminal determines the transmission resource for the PSACH according to time-frequency resource positions of Q reserved resources indicated by the second terminal, wherein Q is a positive integer.

Figure 14:
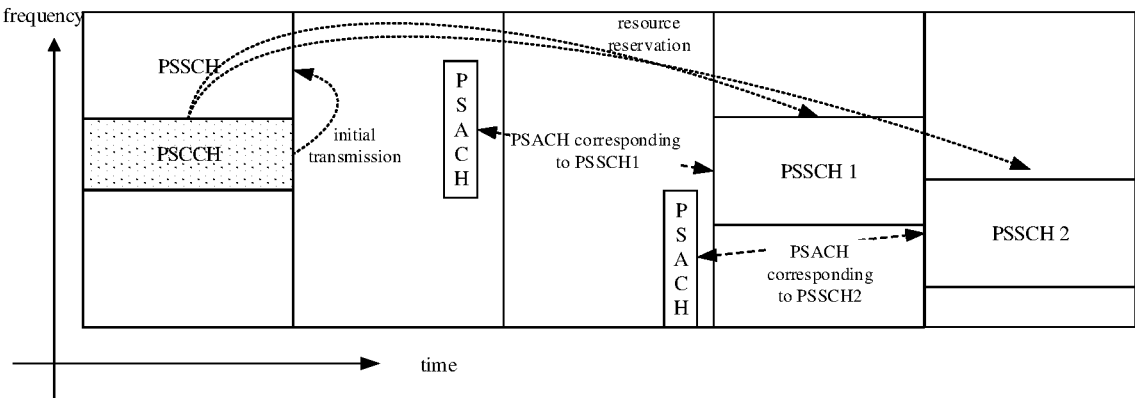
FIG. 14 is a schematic diagram of a corresponding relationship between a PRB used for transmitting a PSACH and a reserved resource provided by an embodiment of the present disclosure.

In method 2, the resources in the reference resource set transmitted by the first terminal correspond to one or more reserved resources indicated by the second terminal. The reference resource set includes Q resources used for PSCCH and/or PSSCH transmission, the Q resources correspond to the Q reserved resources indicated by the second terminal through a PSCCH, and Q≤2; or, the Q resources correspond to the Q reserved resources indicated by the second terminal through a PSSCH. For example, a corresponding relationship between the PRB used for transmitting the PSACH and the reserved resources may be as shown in FIG. 14.

Optionally, in method 2, the first terminal determines a slot j for transmitting the PSACH according to a slot m corresponding to the Q reserved resources:

wherein the slot m is a slot where the Q reserved resources are located, or the slot m is a slot where the first reserved resource among the Q reserved resources is located, and the slot j is the maximum value of a slot index where there exists a PSACH resource before $m-T_{proc,1}-T_{proc,0}$, $T_{proc,0}$ is the time for the second terminal to decode the reference resource set, $T_{proc,1}$ is the time for the second terminal to respond according to the reference resource set.

Optionally, $T_{proc,0}$ and/or $T_{proc,1}$ may be pre-configured or specified in a protocol, or $T_{proc,0}$ and/or $T_{proc,1}$ may be configured or indicated by the network device.

Optionally, in method 2, the first terminal the PRB used for transmitting the PSACH from at least one PRB according to a source terminal identity indicated in SCI used for indicating the Q reserved resources:

wherein the at least one PRB is at least one PRB for the PSACH corresponding to one subchannel in one slot.

For example, the above formula 5 may be referred to, and according to the source terminal identity indicated in the SCI used for indicating the Q reserved resources, the PRB used for transmitting the PSACH is determined from the at least one PRB.

Optionally, in method 2, the first terminal determines the PRB used for transmitting the PSACH from at least one PRB according to a member identity of the first terminal and a source terminal identity indicated in SCI used for indicating the Q reserved resources:

wherein the at least one PRB is at least one PRB for the PSACH corresponding to one subchannel in one slot.

For example, the above formula 6 may be referred to, and according to the source terminal identity indicated in the SCI used for indicating the Q reserved resources and the member identity of the first terminal, the PRB used for transmitting the PSACH is determined from the at least one PRB.

Optionally, in method 2, the first terminal determines a cyclic shift for transmitting the PSACH according to the number of at least one resource in the reference resource set and a state of each resource in the reference resource set.

For example, in a case where the reference resource set includes two resources reserved by the second terminal, the above formula 7 may be referred to, and according to the number of at least one resource in the reference resource set and the state of each resource in the reference resource set, the cyclic shift used for transmitting PSACH may be determined.

Optionally, in Method 2, the first terminal determines at least one cyclic shift group according to the number of at least one PRB for the PSACH corresponding to one subchannel in one slot and the number of cyclic shift groups allowed for each PRB available for PSACH transmission;

the first terminal determines a cyclic shift group for transmitting the PSACH from the at least one cyclic shift group according to a source terminal identity indicated in SCI used for indicating the Q reserved resources; and the first terminal determines a cyclic shift for transmitting the PSACH from the cyclic shift group for transmitting the PSACH according to a state of each resource in the reference resource set.

For example, based on the above formula 8, the first terminal may determine at least one cyclic shift group according to the number of at least one PRB for the PSACH corresponding to one subchannel in one slot and the number of cyclic shift groups allowed for each PRB available for PSACH transmission.

For another example, the first terminal may determine, by referring to the above formula 9, a cyclic shift group for transmitting the PSACH from the at least one cyclic shift group according to a source terminal identity indicated in SCI used for indicating the Q reserved resources.

Optionally, in Method 2:

the first terminal determines at least one cyclic shift group according to the number of at least one PRB for the PSACH corresponding to one subchannel in the slot where the first PSSCH is located and the number of cyclic shift groups allowed for each PRB available for PSACH transmission;

the first terminal determines a cyclic shift group for transmitting the PSACH from the at least one cyclic shift group according to a member identity of the first terminal and a source terminal identity indicated in SCI used for indicating the Q reserved resources: and the first terminal determines a cyclic shift for transmitting the PSACH from the cyclic shift group for transmitting the PSACH according to a state of each resource in the reference resource set.

For example, the first terminal may, based on the above formula 8, determine the at least one cyclic shift group according to the number of PRB(s) for the PSACH corresponding to one subchannel in the slot where the first PSSCH is located and the number of cyclic shift groups allowed for each PRB available for PSACH transmission.

For another example, the first terminal may, by referring to the above formula 10, determine the cyclic shift group used for transmitting the PSACH from the at least one cyclic shift group according to the source terminal identity indicated in the SCI used to indicate the Q reserved resources and the member identity of the first terminal.

Optionally, when the reference resource set includes one resource reserved by the second terminal and there are two cyclic shift groups in each PRB, the first terminal determines the cyclic shift $\alpha$ for transmitting the PSACH according to formula 12 below:

$$\alpha = \frac{2\pi}{N_{SC}^{RB}}\left(\left(m_{cs} + n_{cs}\left(n_{s,f}^{\mu},l'\right)\right)\text{mod } N_{SC}^{RB}\right)$$

<div align="right">Formula 12</div> wherein $m_{cs}$ is a parameter determined according to the state of each resource in the reference resource set, $$n_{cs}\left(n_{s,f}^{\mu},l'\right)$$

is a random number determined according to a transmission slot and a transmission symbol for the PSACH, and $$N_{SC}^{RB}$$

is the number of subcarriers in one RB.

It should be noted that the value of me in formula 12 may be determined according to Table 4 or Table 5 below.

TABLE 4

| state of one resource | {not suitable for transmission by the second terminal or suitable for transmission by the second terminal} | other cases |
|---|---|---|
| first cyclic shift group $m_{cs}$ | $m_{CS} = 0$ | do not transmit PSACH |
| second Rotate Group $m_{cs}$ | $m_{CS} = 6$ | do not transmit PSACH |

TABLE 5

| state of one resource | {not suitable for transmission by the second terminal or suitable for transmission by the second terminal} | {suitable for transmission by the second terminal or not suitable for transmission by the second terminal} |
|---|---|---|
| first cyclic shift group $m_{cs}$ | $m_{CS} = 0$ | $m_{CS} = 6$ |
| second Rotate Group $m_{cs}$ | $m_{CS} = 3$ | $m_{CS} = 9$ |

Method 3: the first terminal determines the PRB used for transmitting the PSACH according to a PRB set used by the second terminal for PSTCH transmission.

In method 3, the PRB set used for PSACH transmission and the PRB set used for PSTCH transmission are the same or associated with other one by one.

Optionally, the first terminal receives trigger signaling transmitted by the second terminal through the PSTCH on a k1-th PRB in a PSTCH resource set in a slot n, wherein the trigger signaling is used to trigger the first terminal to transmit the reference resource set; and the first terminal determines to transmit the PSACH on a k2-th PRB in a slot m;

wherein the slot m is determined by the slot n, and the k2 is determined by the k1.

Optionally, a PSACH resource set exists on the slot m; or, a PSACH resource set associated with the PSTCH resource set exists on the slot m; and/or, an interval between n and m is not less than a first threshold.

Optionally, k2 is equal to k1; or, k2 is equal to the sum of k1 and an offset value, the offset value is pre-configured or specified by a protocol, or the offset value is configured by a network device. The offset value may be 0, that is, the interval between the slot n and the slot m may be 0.

It should be noted that there is a PSACH resource set on the slot m; or, there is a PSACH resource set associated with the PSTCH resource set on the slot m.

Method 4: in a case where a first condition is met and a PSACH resource is configured in a resource pool used by the first terminal, the first terminal determines a PSACH resource corresponding to a PSSCH scheduled by the first PSCCH as a resource for transmitting the PSACH;

wherein the first terminal successfully decodes the first PSCCH transmitted by the second terminal, and the second terminal reserves, through the first PSCCH, P resources for Transport Block (TB) retransmission, and P is a positive integer.

Optionally, in method 4, the first condition includes but is not limited to at least one of the following:

the first terminal detects that there is a resource conflict between a PSSCH scheduled by a PSCCH of a third terminal and the first PSCCH transmitted by the second terminal, and a difference between a Reference Signal Received Power (RSRP) of the third terminal measured by the first terminal and a RSRP of the second terminal measured by the first terminal is less than a second threshold;

the first terminal detects that one or more resources reserved by the third terminal through the PSCCH overlap with a resource used for PSCCH transmission among one or more resources reserved by the second terminal, and a difference between the RSRP of the third terminal measured by the terminal and the RSRP of the second terminal measured by the first terminal is less than a third threshold;

the first terminal detects the PSCCH transmitted by the third terminal and a second-stage SCI in the PSSCH scheduled by the PSCCH transmitted by the third terminal, and a source terminal identity indicated in the second-stage SCI and a destination terminal identity indicated by a second-stage SCI in the PSSCH transmitted by the second terminal are the same, and a slot in which the third terminal transmits the PSCCH is the same as a slot in which the second terminal transmits the PSCCH; and the first terminal detects the PSCCH transmitted by the third terminal and the second-stage SCI in the PSSCH scheduled by the PSCCH transmitted by the third terminal, and the source terminal identity indicated in the second-stage SCI and the destination terminal identity indicated in the second-stage SCI in the PSSCH transmitted by the second terminal are the same, and one or more resources reserved by the third terminal and one or more resources reserved by the second terminal are located at the same slot.

Optionally, in some embodiments, the second terminal detects the PSACH carrying the reference resource set on a target PSACH resource.

Optionally, the target PSACH resource includes but is not limited to at least one of the following:

a PSACH resource corresponding to a reserved resource indicated by the second terminal, a PSACH resource corresponding to a Physical Sidelink Shared Channel (PSSCH) transmitted by the second terminal for indicating a reserved resource, a PSACH resource corresponding to a PSSCH scheduled by a Physical Sidelink Control Channel (PSCCH) transmitted by the second terminal for indicating a resource reserved, and a PSACH resource corresponding to the trigger signaling transmitted by the second terminal for triggering the first terminal to provide the reference resource set.

Optionally, in some embodiments, in a case where one or more resources in the reference resource set conflict with a resource reserved by another terminal, the second terminal reselects a reserved resource; or, in a case where the second terminal determines that there is a half-duplex restriction according to the reference resource set, the second terminal reselects a reserved resource.

Therefore, in the embodiments of the present disclosure, the first terminal may transmit the reference resource set to the second terminal through the PSACH, thereby improving the resource selection performance of the second terminal. The first terminal may determine the resource for transmitting the PSACH according to the time-frequency resource position where the PSCCH/PSSCH for indicating resource reservation by the second terminal is located, or the time-frequency location of a resource reserved by the second terminal, or the time-frequency resource position where the second terminal transmits trigger signaling. In the embodiments of the present disclosure, the transmission of the reference resource set can be realized with a small signaling overhead by making minor changes to the standard or protocol, thereby improving the performance of the resource selection of the second terminal.

The method embodiments of the present disclosure are described in detail above with reference to FIG. 12 to FIG. 14, and the device embodiments of the present disclosure are described in detail below with reference to FIG. 15 to FIG. 19. It should be understood that the device embodiments and the method embodiments correspond to each other, and for similar descriptions, description regarding the method embodiments may be referred to.

Figure 15:
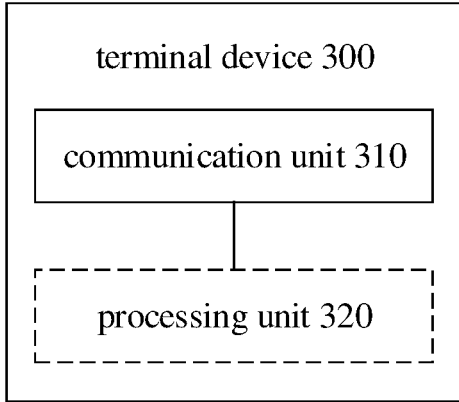
FIG. 15 is a schematic block diagram of a terminal device according to an embodiment of the present disclosure.

FIG. 15 shows a schematic block diagram of a terminal device 300 according to an embodiment of the present disclosure. As shown in FIG. 15, the terminal device is a first terminal, and the terminal device 300 includes a communication unit 310.

The communication unit 310 is configured to transmit a reference resource set to a second terminal through a PSACH:

wherein the reference resource set is used for the second terminal to perform resource selection or resource reselection, or the reference resource set is used to trigger the second terminal to perform resource selection or resource reselection.

Optionally, the Terminal Device 300 Further Includes:

a processing unit 320 configured to determine a Physical Resource Block (PRB) set available for PSACH transmission.

Optionally, a period of a PRB set used for PSACH transmission in a resource pool is the same as a period of a PRB set available for physical sidelink triggering channel PSFCH transmission in the resource pool, and the PRB set used for PSACH transmission is located at the last two Orthogonal Frequency-Division Multiplexing (OFDM) symbols available for sidelink communication in one slot.

Optionally, at least one PRB included in the PRB set used for PSACH transmission is the same as at least one PRB included in the PRB set used for PSFCH transmission, or the at least one PRB included in the PRB set used for PSACH transmission is at least in part different from the at least one PRB included in the PRB set used for PSFCH transmission.

Optionally, a PRB set available for PSACH transmission in a resource pool is located at the last OFDM symbol available for sidelink communication in each slot.

Optionally, the PRB set for PSACH transmission in a slot includes all PRBs in the last OFDM symbol available for sidelink communication.

Optionally, the terminal device further includes:

a processing unit 320 configured to determine a transmission resource for the PSACH, wherein a PRB used for transmitting the PSACH belongs to the PRB set for PSACH transmission determined by the first terminal.

Optionally, the processing unit 320 is configured to:

determine the transmission resource for the PSACH according to a time-frequency resource position of a first Physical Sidelink Shared Channel (PSSCH) transmitted by the second terminal.

Optionally, the processing unit 320 is configured to:

determine, from at least one PRB, the PRB used for transmitting the PSACH;

wherein the at least one PRB is at least one PRB for a PSACH corresponding to a subchannel in a slot where the first PSSCH is located.

Optionally, the processing unit 320 is configured to:

determine, from the at least one PRB, the PRB used for transmitting the PSACH according to a source terminal identity indicated in Sidelink Control Information (SCI) used for scheduling the first PSSCH.

Optionally, the processing unit 320 is configured to:

determine, from the at least one PRB, the PRB used for transmitting the PSACH according to a member identity of the first terminal and a source terminal identity indicated in SCI used for scheduling the first PSSCH.

Optionally, the processing unit 320 is further configured to determine the at least one PRB for the PSACH corresponding to one subchannel in the slot where the first PSSCH is located:

$$\left[ \left( i + j \cdot N^{PSACH} \right) \cdot M_{subch,slot}^{PSACH}, \left( i + 1 + j \cdot N^{PSACH} \right) \cdot M_{subch,slot}^{PSACH} - 1 \right];$$

wherein $$M_{subch,slot}^{PSACH}$$

represents the number of the at least one PRB for the PSACH corresponding to one subchannel in the slot where the first PSSCH is located, $N^{PSACH}$ represents a period of a PSACH resource, a start of the first PSSCH is located in slot i, the slot i occupies one or more subchannels starting from a j-th subchannel, $0 \le i < N$ PSACH $0 \le j < N_{subch}$, $N_{subch}$ represents the number of subchannels included in a resource pool used by the first terminal.

Optionally, the processing unit 320 is further configured to determine a cyclic shift for transmitting the PSACH according to the number of at least one resource in the reference resource set and a state of each resource in the reference resource set.

Optionally, the processing unit 320 is configured to:

in a case where the reference resource set includes two resources reserved by the second terminal, determine the cyclic shift α for transmitting the PSACH according to the following formula:

$$\alpha = \frac{2\pi}{N_{SC}^{RB}} \left( \left( m_0 + m_{cs} + n_{cs} \left( n_{s,f'}^{\mu} \right) \right) \bmod N_{SC}^{RB} \right);$$

wherein $m_{cs}$ is a parameter determined according to the state of each resource in the reference resource set, $$n_{cs} \left( n_{s,f'}^{\mu} \right)$$

is a random number determined according to a transmission slot and a transmission symbol for the PSACH, and $$N_{SC}^{RB}$$

is the number of subcarriers in one Resource Block (RB).

Optionally, the terminal device 300 further includes a processing unit 320:

the processing unit 320 is configured to determine at least one cyclic shift group according to the number of at least one PRB for the PSACH corresponding to the subchannel in the slot where the first PSSCH is located and the number of cyclic shift groups allowed for each PRB available for PSACH transmission;

the processing unit 320 is configured to determine a cyclic shift group for transmitting the PSACH from the at least one cyclic shift group according to a source terminal identity indicated in SCI used for scheduling the first PSSCH; and the processing unit 320 is configured to determine a cyclic shift for transmitting the PSACH from the cyclic shift group for transmitting the PSACH according to a state of each resource in the reference resource set.

Optionally, the terminal device 300 further includes a processing unit 320:

the processing unit 320 is configured to determine at least one cyclic shift group according to the number of at least one PRB for the PSACH corresponding to the subchannel in the slot where the first PSSCH is located and the number of cyclic shift groups allowed for each PRB available for PSACH transmission;

the processing unit 320 is configured to determine a cyclic shift group for transmitting the PSACH from the at least one cyclic shift group according to a member identity of the first terminal and a source terminal identity indicated in SCI used for scheduling the first PSSCH; and the processing unit 320 is configured to determine a cyclic shift for transmitting the PSACH from the cyclic shift group for transmitting the PSACH according to a state of each resource in the reference resource set.

Optionally, the processing unit 320 is configured to:

in a case where the reference resource set includes one resource reserved by the second terminal and there are two cyclic shift groups in each PRB, determine the cyclic shift $\alpha$ for transmitting the PSACH:

$$\alpha = \frac{2\pi}{N_{SC}^{RB}}\left(\left(m_0 + m_{cs} + n_{cs}\left(n_{s,f}^{\mu}, l'\right)\right) \bmod N_{SC}^{RB}\right);$$

wherein $m_{cs}$ is a parameter determined according to the state of each resource in the reference resource set, $$n_{cs}\left(n_{s,f}^{\mu}, l'\right)$$

is a random number determined according to a transmission slot and a transmission symbol for the PSACH, and $$N_{SC}^{RB}$$

is the number of subcarriers in one RB.

Optionally, the processing unit 320 is further configured to:

determine the number of at least one PRB for the PSACH corresponding to one subchannel in the slot where the first PSSCH is located according to the following formula:

$$M_{subch,slot}^{PSACH} = M_{PRB,set}^{PSACH}/\left(N_{subch}\cdot N^{PSACH}\right);$$

wherein $$M_{subch,slot}^{PSACH}$$

represents the number of at least one PRB for the PSACH corresponding to one subchannel in the slot where the first PSSCH is located, $$M_{PRB,set}^{PSACH}$$

represents the number of at least one PRB configured for PSACH transmission, $N_{subch}$ represents the number of PSSCH subchannels included in a resource pool used by the first terminal, and N PSACH represents a period of a PSACH resource.

Optionally, the reference resource set includes N resources used for Physical Sidelink Control Channel (PSCCH) and/or PSSCH transmission, and the N resources correspond to N reserved resources indicated by the second terminal through a PSCCH used for scheduling the first PSSCH, N is a positive integer, and N≤2; or, the reference resource set includes M resources used for PSCCH and/or PSSCH transmission, and the M resources correspond to M reserved resources indicated by the second terminal through the first PSSCH, and M is a positive integer.

Optionally, the first PSSCH is located at a time unit n, and the transmission resource for the PSACH is located at a time unit m; and an interval between n and m is not smaller than a first threshold, and the time unit includes a symbol and/or a slot.

Optionally, the processing unit 320 is configured to:

determine the transmission resource for the PSACH according to time-frequency resource positions of Q reserved resources indicated by the second terminal, wherein Q is a positive integer.

Optionally, the reference resource set includes Q resources used for PSCCH and/or PSSCH transmission, the Q resources correspond to the Q reserved resources indicated by the second terminal through a PSCCH, and Q≤2, or, the Q resources correspond to the Q reserved resources indicated by the second terminal through a PSSCH.

Optionally, the processing unit 320 is configured to:

determine a slot j for transmitting the PSACH according to a slot m corresponding to the Q reserved resources;

wherein the slot m is a slot where the Q reserved resources are located, or the slot m is a slot where the first reserved resource among the Q reserved resources is located, and the slot j is the maximum value of a slot index where there exists a PSACH resource before $m-T_{proc,1}-T_{proc,0}$, $T_{proc,0}$ is the time for the second terminal to decode the reference resource set, $T_{proc,1}$ is the time for the second terminal to respond according to the reference resource set.

Optionally, the processing unit 320 is configured to:

determine the PRB used for transmitting the PSACH from at least one PRB according to a source terminal identity indicated in SCI used for indicating the Q reserved resources;

wherein the at least one PRB is at least one PRB for the PSACH corresponding to one subchannel in one slot.

Optionally, the processing unit 320 is configured to:

determine the PRB used for transmitting the PSACH from at least one PRB according to a member identity of the first terminal and a source terminal identity indicated in SCI used for indicating the Q reserved resources;

wherein the at least one PRB is at least one PRB for the PSACH corresponding to one subchannel in one slot.

Optionally, at least one PRB for the PSACH corresponding to one subchannel in one slot:

$$[(i + j \cdot N^{PSACH}) \cdot M_{subch,slot}^{PSACH}, (i + 1 + j \cdot N^{PSACH}) \cdot M_{subch,slot}^{PSACH} - 1];$$

wherein M PSACH subch, slot represents the number of at least one PRB for the PSACH corresponding to one subchannel in one slot, $N^{PSACH}$ represents a period of a PSACH resources, a start of a PSSCH is located at slot i, and slot i occupies one or more subchannels starting from a j-th subchannel, 0<<N PSACH, 0<<N$_{subch}$, Noch represents the number of subchannels included in a resource pool used by the first terminal.

Optionally, the processing unit 320 is further configured to:

determine a cyclic shift for transmitting the PSACH according to the number of at least one resource in the reference resource set and a state of each resource in the reference resource set.

Optionally, the processing unit 320 is configured to:

in a case where the reference resource set includes two resources reserved by the second terminal, determine the cyclic shift α for transmitting the PSACH according to the following formula:

$$\alpha = \frac{2\pi}{N_{SC}^{RB}} \left( (m_0 + m_{cs} n_{cs}(n_{s,f'}^{\mu})) \bmod N_{SC}^{RB} \right);$$

wherein m$_{cs}$ is a parameter determined according to the state of each resource in the reference resource set, $$n_{cs}(n_{s,f'}^{\mu})$$

is a random number determined according to a transmission slot and a transmission symbol for the PSACH, and $$N_{SC}^{RB}$$

is the number of subcarriers in one RB.

Optionally, the terminal device 300 further includes processing unit 320;

the processing unit 320 is configured to determine at least one cyclic shift group according to the number of at least one PRB for the PSACH corresponding to one subchannel in one slot and the number of cyclic shift groups allowed for each PRB available for PSACH transmission;

the processing unit 320 is configured to determine a cyclic shift group for transmitting the PSACH from the at least one cyclic shift group according to a source terminal identity indicated in SCI used for indicating the Q reserved resources; and the processing unit 320 is configured to determine a cyclic shift for transmitting the PSACH from the cyclic shift group for transmitting the PSACH according to a state of each resource in the reference resource set.

Optionally, the terminal device 300 further includes processing unit 320;

the processing unit 320 is configured to determine at least one cyclic shift group according to the number of at least one PRB for the PSACH corresponding to one subchannel in the slot where the first PSSCH is located and the number of cyclic shift groups allowed for each PRB available for PSACH transmission;

the processing unit 320 is configured to determine a cyclic shift group for transmitting the PSACH from the at least one cyclic shift group according to a member identity of the first terminal and a source terminal identity indicated in SCI used for indicating the Q reserved resources; and the processing unit 320 is configured to determine a cyclic shift for transmitting the PSACH from the cyclic shift group for transmitting the PSACH according to a state of each resource in the reference resource set.

Optionally, the processing unit 320 is configured to:

in a case where the reference resource set includes one resource reserved by the second terminal and there are two cyclic shift groups in each PRB, determining, by the first terminal the cyclic shift α for transmitting the PSACH:

$$\alpha = \frac{2\pi}{N_{SC}^{RB}} \left( (m_{cs} + n_{cs}(n_{s,f'}^{\mu}, l')) \bmod N_{SC}^{RB} \right);$$

wherein m$_{cs}$ is a parameter determined according to the state of each resource in the reference resource set, $$n_{cs}(n_{s,f'}^{\mu}, l')$$

is a random number determined according to a transmission slot and a transmission symbol for the PSACH, and $$N_{SC}^{RB}$$

is the number of subcarriers in one RB.

Optionally, the number of at least one PRB for the PSACH corresponding to one subchannel in one slot is determined according to the following formula:

$$M_{subch,slot}^{PSACH} = M_{PRB,set}^{PSACH} / (N_{subch} \cdot N^{PSACH});$$

wherein $$M_{subch,slot}^{PSACH}$$

represents the number or at least one PRB for the PSACH corresponding to one subchannel in one slot, $$M_{PRB,set}^{PSACH}$$

represents the number of at least one PRB configured for PSACH transmission, $N_{subch}$ represents the number of PSSCH subchannels included in a resource pool used by the first terminal, and N PSACH represents a period of a PSACH resource.

Optionally, the processing unit 320 is configured to:

determine the PRB used for transmitting the PSACH according to a PRB set used by the second terminal for Physical Sidelink Triggering Channel (PSTCH) transmission.

Optionally, the communication unit 310 is further configured to receive trigger signaling transmitted by the second terminal through the PSTCH on a k1-th PRB in a PSTCH resource set in a slot n, wherein the trigger signaling is used to trigger the first terminal to transmit the reference resource set; and the processing unit 320 is configured to determine to transmit the PSACH on a k2-th PRB in a slot m;

wherein the slot m is determined by the slot n, and the k2 is determined by the k1.

Optionally, a PSACH resource set exists on the slot m; or, a PSACH resource set associated with the PSTCH resource set exists on the slot m; and/or, an interval between n and m is not less than a first threshold.

Optionally, k2 is equal to k1: or, k2 is equal to the sum of k1 and an offset value, the offset value is pre-configured or specified by a protocol, or the offset value is configured by a network device.

Optionally, the processing unit 320 is configured to:

in a case where a first condition is met and a PSACH resource is configured in a resource pool used by the first terminal, determining, by the first terminal, a PSACH resource corresponding to a PSSCH scheduled by the first PSCCH as a resource for transmitting the PSACH;

wherein the first terminal successfully decodes the first PSCCH transmitted by the second terminal, and the second terminal reserves, through the first PSCCH, P resources for Transport Block (TB) retransmission, and P is a positive integer.

Optionally, the first condition includes at least one of the following that:

the first terminal detects that there is a resource conflict between a PSSCH scheduled by a PSCCH of a third terminal and the first PSCCH transmitted by the second terminal, and a difference between a Reference Signal Received Power (RSRP) of the third terminal measured by the first terminal and a RSRP of the second terminal measured by the first terminal is less than a second threshold;

the first terminal detects that one or more resources reserved by the third terminal through the PSCCH overlap with a resource used for PSCCH transmission among one or more resources reserved by the second terminal, and a difference between the RSRP of the third terminal measured by the terminal and the RSRP of the second terminal measured by the first terminal is less than a third threshold;

the first terminal detects the PSCCH transmitted by the third terminal and a second-stage SCI in the PSSCH scheduled by the PSCCH transmitted by the third terminal, and a source terminal identity indicated in the second-stage SCI and a destination terminal identity indicated by a second-stage SCI in the PSSCH transmitted by the second terminal are the same, and a slot in which the third terminal transmits the PSCCH is the same as a slot in which the second terminal transmits the PSCCH; and the first terminal detects the PSCCH transmitted by the third terminal and the second-stage SCI in the PSSCH scheduled by the PSCCH transmitted by the third terminal, and the source terminal identity indicated in the second-stage SCI and the destination terminal identity indicated in the second-stage SCI in the PSSCH transmitted by the second terminal are the same, and one or more resources reserved by the third terminal and one or more resources reserved by the second terminal are located at the same slot.

Optionally, in some embodiments, the above-mentioned communication unit may be a communication interface or a transceiver, or an input-output interface of a communication chip or a system on chip. The above-mentioned processing unit may be one or more processors.

It should be understood that the terminal device 300 according to the embodiments of the present disclosure may correspond to the first terminal in the method embodiments of the present disclosure, and the above-mentioned and other operations and/or functions of each unit in the terminal device 300 are to realize the corresponding processes of the first terminal in the method 200 shown in FIG. 12, and for the sake of brevity, details are not repeated here.

Figure 16:
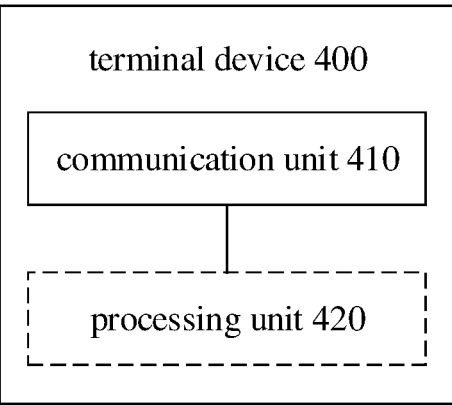
FIG. 16 is a schematic block diagram of a network device according to an embodiment of the present disclosure.

FIG. 16 shows a schematic block diagram of a terminal device 400 according to an embodiment of the present disclosure. As shown in FIG. 16, the terminal device is a second terminal, and the terminal device 400 includes a communication unit 410.

The communication unit 410 is configured to receive a reference resource set transmitted from a first terminal through a Physical Sidelink Assistant Channel (PSACH);

wherein the reference resource set is used for the second terminal to perform resource selection or resource reselection, or the reference resource set is used to trigger the second terminal to perform resource selection or resource reselection.

Optionally, the communication unit 410 is configured to:

detect the PSACH carrying the reference resource set on a target PSACH resource.

Optionally, the target PSACH resource includes at least one of the following:

a PSACH resource corresponding to a reserved resource indicated by the second terminal, a PSACH resource corresponding to a Physical Sidelink Shared Channel (PSSCH) transmitted by the second terminal for indicating a reserved resource, a PSACH resource corresponding a PSSCH scheduled by a Physical Sidelink Control Channel (PSCCH) transmitted by the second terminal for indicating a reserved resource, and a PSACH resource corresponding to trigger signaling transmitted by the second terminal for triggering the first terminal to provide the reference resource set.

Optionally, the terminal device further includes a processing unit 420 configured to:

in a case where one or more resources in the reference resource set conflict with a resource reserved by another terminal, reselect a reserved resource; or, in a case where the second terminal determines that there is a half-duplex restriction according to the reference resource set, reselect a reserved resource.

Optionally, in some embodiments, the above-mentioned communication unit may be a communication interface or a transceiver, or an input-output interface of a communication chip or a system on chip. The above-mentioned processing unit may be one or more processors.

It should be understood that the terminal device 400 according to the embodiments of the present disclosure may correspond to the second terminal in the method embodiments of the present disclosure, and the above-mentioned and other operations and/or functions of each unit in the terminal device 400 are to realize the corresponding processes of the second terminal in the method 200 shown in FIG. 12, and for the sake of brevity, details are not repeated here.

Figure 17:
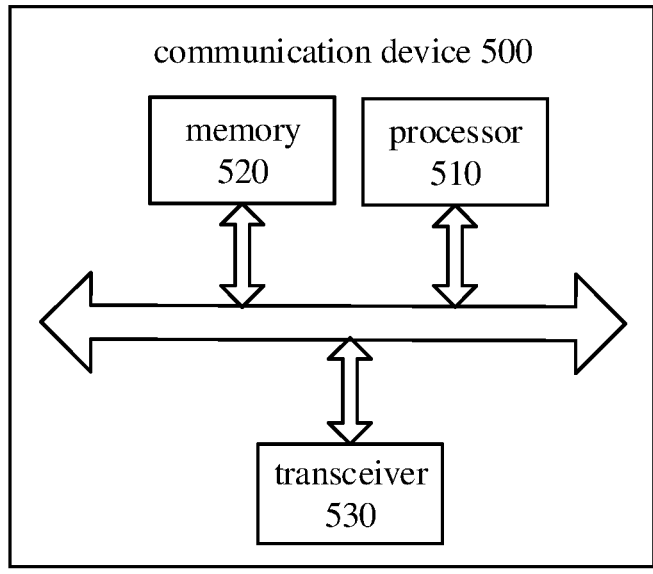
FIG. 17 is a schematic block diagram of a communication device according to an embodiment of the present disclosure.

FIG. 17 is a schematic structural diagram of a communication device 500 provided by an embodiment of the present disclosure. The communication device 500 shown in FIG. 17 includes a processor 510, and the processor 510 may call and run a computer program from a memory, so as to implement the methods in the embodiments of the present disclosure.

Optionally, as shown in FIG. 17, the communication device 500 may further include a memory 520. The processor 510 may call and run a computer program from the memory 520, so as to implement the methods in the embodiments of the present disclosure.

The memory 520 may be an independent device independent of the processor 510, or may be integrated in the processor 510.

Optionally, as shown in FIG. 17, the communication device 500 may further include a transceiver 530, and the processor 510 may control the transceiver 530 to communicate with other devices, specifically, to send information or data to other devices, or receive information or data sent from other devices.

The transceiver 530 may include a transmitter and a receiver. The transceiver 530 may further include one or more antennas.

Optionally, the communication device 500 may specifically be the terminal device of the embodiments of the present disclosure, and the communication device 500 may implement the corresponding processes implemented by the first terminal in each method embodiment of the present disclosure. For the sake of brevity, repeated descriptions are omitted.

Optionally, the communication device 500 may specifically be the terminal device in the embodiments of the present disclosure, and the communication device 500 may implement the corresponding processes implemented by the second terminal in each method embodiment of the present disclosure. For the sake of brevity, repeated descriptions are omitted.

Figure 18:
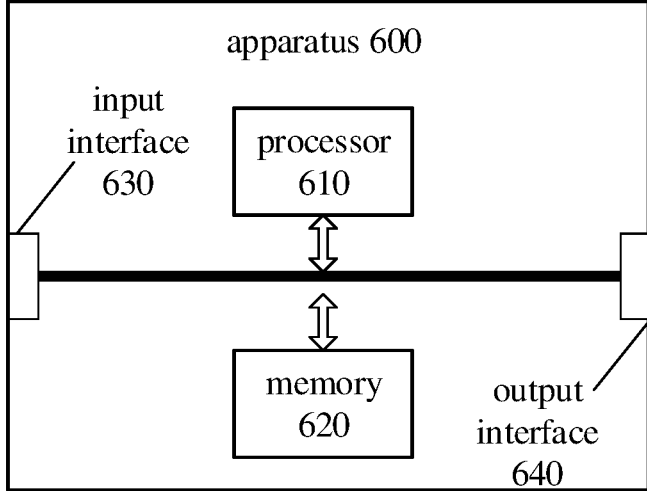
FIG. 18 is a schematic block diagram of an apparatus according to an embodiment of the present disclosure.

FIG. 18 is a schematic structural diagram of an apparatus according to an embodiment of the present disclosure. The apparatus 600 shown in FIG. 18 includes a processor 610, and the processor 610 may call and run a computer program from a memory, so as to implement the methods in the embodiments of the present disclosure.

Optionally, as shown in FIG. 18, the apparatus 600 may further include a memory 620. The processor 610 may call and run a computer program from the memory 620, so as to implement the methods in the embodiments of the present disclosure.

The memory 620 may be an independent device independent of the processor 610, or may be integrated in the processor 610.

Optionally, the device 600 may further include an input interface 630. The processor 610 may control the input interface 630 to communicate with other apparatuses or chips, specifically, may obtain information or data sent by other apparatuses or chips.

Optionally, the device 600 may further include an output interface 640. The processor 610 may control the output interface 640 to communicate with other apparatuses or chips, specifically, may output information or data to other apparatuses or chips.

Optionally, the apparatus may be applied to the terminal device in the embodiments of the present disclosure, and the apparatus may implement the corresponding processes implemented by the first terminal in the method embodiments of the present disclosure. For the sake of brevity, details are not repeated here.

Optionally, the apparatus may be applied to the terminal device in the embodiments of the present disclosure, and the apparatus may implement the corresponding process implemented by the second terminal in the method embodiments of the present disclosure. For the sake of brevity, details are not repeated here.

Optionally, the apparatus mentioned in the embodiments of the present disclosure may also be a chip. For example, it may be a system level chip, a system chip, a chip system, or a system on chip.

Figure 19:
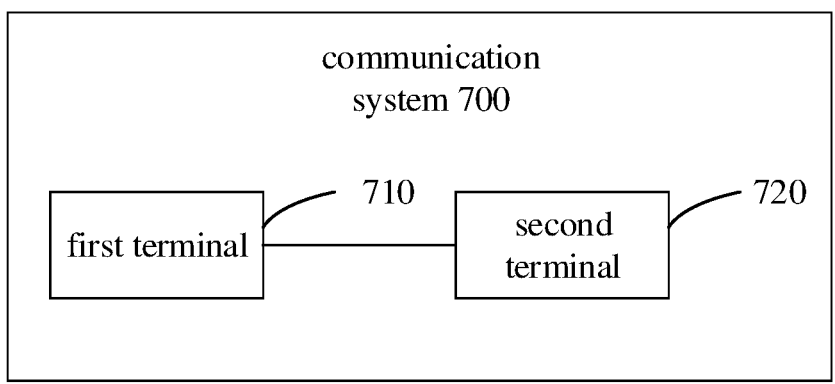
FIG. 19 is a schematic block diagram of a communication system according to an embodiment of the present disclosure.

FIG. 19 is a schematic block diagram of a communication system 700 provided by an embodiment of the present disclosure. As shown in FIG. 19, the communication system 700 includes a first terminal 710 and a second terminal 720.

The first terminal 710 may be used to realize the corresponding functions realized by the first terminal in the above methods, and the second terminal 720 may be used to realize the corresponding functions realized by the second terminal in the above methods. For the sake of brevity, details are not repeated here.

It should be understood that the processor in embodiments of the present disclosure may be an integrated circuit chip with signal processing capability. In implementations, the steps of the foregoing method embodiments can be completed by hardware integrated logic circuits in the processor or instructions in the form of software. The above-mentioned processor may be a general-purpose processor, a Digital Signal Processor (DSP), an Application Specific Integrated Circuit (ASIC), a Field Programmable Gate Array (FPGA) or other programmable logic device, discrete gate or transistor logic device, discrete hardware component. The methods, steps, and logical block diagrams disclosed in the embodiments of the present disclosure can be implemented or executed. The general-purpose processor may be a microprocessor or the processor may also be any conventional processor or the like. The steps of the methods disclosed in the embodiments of the present disclosure may be directly embodied as being executed and completed by a hardware decoding processor, or executed by a combination of hardware and software modules in the decoding processor. The software module can be located in a storage medium in the field, such as random access memory, flash memory, read-only memory, programmable read-only memory, or electrically erasable programmable memory, register. The storage medium is located in the memory, and the processor reads the information in the memory to perform the steps of the above methods in combination with hardware.

It can be understood that the memory in the embodiments of the present disclosure may be volatile memory or non-volatile memory, or may include both volatile and non-volatile memory. The non-volatile memory can be Read- Only Memory (ROM), Programmable ROM (PROM), Erasable PROM (EPROM), Electrically EPROM (EE-PROM) or flash memory. The volatile memory may be a Random Access Memory (RAM), which is used as an external cache. By way of exemplary rather than limitation, many forms of RAM are available, such as Static RAM (SRAM), Dynamic RAM (DRAM), Synchronous DRAM (SDRAM), Double Data Rate SDRAM (DDR SDRAM), Enhanced SDRAM (ESDRAM), Synchlink DRAM (SL-DRAM)), or Direct Rambus RAM (DR RAM). It should be noted that the memory in the systems and methods described in the present disclosure is intended to include but not limited to these and any other suitable types of memory.

It should be understood that the foregoing memory is exemplary but not restrictive. For example, the memory in embodiments of the present disclosure may also be Static RAM (SRAM), Dynamic RAM (DRAM), Synchronous DRAM (SDRAM), Double Data Rate SDRAM (DDR SDRAM), Enhanced SDRAM (ESDRAM), Synchlink DRAM (SLDRAM), or Direct Rambus RAM (DR RAM), and so on. That is to say, the memory in embodiments of the present disclosure is intended to include but not limited to these and any other suitable types of memory.

An embodiment of the present disclosure also provides a computer-readable storage medium for storing computer programs.

According to embodiments, the computer-readable storage medium may be applied to the terminal device in embodiments of the present disclosure, and the computer programs cause a computer to perform the corresponding processes implemented by the first terminal in each method embodiment of the present disclosure. For brevity, repeated descriptions are omitted here.

According to embodiments, the computer-readable storage medium may be applied to the terminal device in embodiments of the present disclosure, and the computer programs cause a computer to perform the corresponding processes implemented by the second terminal in each method embodiment of the present disclosure. For brevity, repeated descriptions are omitted here.

An embodiment of the present disclosure provides a computer program product, including computer program instructions.

According to embodiments, the computer program product may be applied to the terminal device in embodiments of the present disclosure, and the computer program instructions cause a computer to perform the corresponding processes implemented by the first terminal in each method embodiment of the present disclosure. For brevity, repeated descriptions are omitted here.

According to embodiments, the computer program product may be applied to the terminal device in embodiments of the present disclosure, and the computer program instructions cause a computer to perform the corresponding processes implemented by the second terminal in each method embodiment of the present disclosure. For brevity, repeated descriptions are omitted here.

An embodiment of the present disclosure also provides a computer program.

According to embodiments, the computer program may be applied to the terminal device in embodiments of the present disclosure, and when the computer program runs on a computer, the computer is caused to perform the corresponding processes implemented by the first terminal device in each method embodiment of the present disclosure. For brevity, repeated descriptions are omitted here.

According to embodiments, the computer program may be applied to the terminal device in embodiments of the present disclosure, and when the computer program runs on a computer, the computer is caused to perform the corresponding processes implemented by the second terminal in each method embodiment of the present disclosure. For brevity, repeated descriptions are omitted here.

Those of ordinary skill in the art will appreciate that the exemplary units and algorithm steps described according to embodiments disclosed herein can be carried out by electronic hardware or a combination of electronic hardware and computer software. Whether the functions are implemented by hardware or software depends on particular applications and design constraints of the technical solutions. For each of the particular applications, a person skilled in the art can use different methods to implement the described functions, but such implementation should not be considered as beyond the scope of the present disclosure.

It may be clearly understood by those skilled in the art that details of specific operation procedures of the systems, devices and units can be found in the previous description regarding the method embodiments.

In the embodiments provided in the present disclosure, it should be understood that the disclosed systems, devices and methods may be implemented in other ways. For example, the device embodiments described above are merely illustrative. For example, the division of the units is only a kind of logical function division. In practice, other division manner may be used. For example, multiple units or components may be combined or integrated into another system, or some features may be ignored or not performed. In addition, the illustrated or discussed mutual coupling or direct coupling or communication connection may be indirect coupling or communication connection through some interfaces, devices or units, and may be in electrical, mechanical or other forms.

The units described as separated parts may or may not be physically separated, and the parts displayed as units may or may not be physical units, that is, the units may be located in one place, or may be distributed over multiple network units. Some or all of the units may be selected according to actual needs to achieve the objectives of the solutions in the embodiments.

In addition, the functional units in the embodiments of the present disclosure may be integrated in one processing unit, or the units may exist alone physically, or two or more units may be integrated in one unit.

The functions may also be stored in a computer-readable storage medium if being implemented in the form of a software functional unit and sold or used as an independent product. Based on such understanding, the essence of the technical solutions of the present disclosure, or the part contributing to the prior art or part of the technical solutions, may be embodied in the form of a software product. The computer software product is stored in a storage medium including a number of instructions such that a computer device (which may be a personal computer, a server, or a network device, etc.) performs all or part of steps of the method described in each of the embodiments of the present disclosure. The foregoing storage medium includes: any medium that is capable of storing program codes such as a USB disk, a mobile hard disk, a Read-Only Memory (ROM), a Random Access Memory (RAM), a magnetic disk or an optical disk, and the like.

The foregoing descriptions are merely exemplary embodiments of the present disclosure, but the protection scope of the present disclosure is not limited thereto. Any person skilled in the art can easily think of changes or substitutions within the technical scope of the present disclosure, and all the changes or substitutions should be covered by the protection scope of the present disclosure. Therefore, the protection scope of the present disclosure should be defined by the appended claims.

What is claimed is:

1. A wireless communication method, comprising:

transmitting, by a first terminal, a reference resource set to a second terminal through a physical channel in sequence format, wherein the reference resource set is carried in the physical channel in sequence format;

wherein the reference resource set is used for the second terminal to perform resource selection or resource reselection, or the reference resource set is used to trigger the second terminal to perform resource selection or resource reselection;

wherein the method further comprises:

determining, by the first terminal, a Physical Resource Block (PRB) set available for transmission of the physical channel in sequence format;

wherein the method further comprises:

determining, by the first terminal, a transmission resource for the physical channel in sequence format according to a time-frequency resource position of a first Physical Sidelink Shared Channel (PSSCH) transmitted by the second terminal, wherein a PRB used for transmitting the physical channel in sequence format belongs to the PRB set for transmission of the physical channel in sequence format determined by the first terminal;

wherein determining, by the first terminal, the transmission resource for the physical channel in sequence format comprises:

determining, by the first terminal, the transmission resource for the physical channel in sequence format according to time-frequency resource positions of Q reserved resources indicated by the second terminal, wherein Q is a positive integer;

wherein:

the reference resource set comprises Q resources used for at least one of Physical Sidelink Control Channel (PSCCH) or PSSCH transmission, the Q resources correspond to the Q reserved resources indicated by the second terminal through a PSCCH, and Q≤2, or, the Q resources correspond to the Q reserved resources indicated by the second terminal through a PSSCH.

2. The method according to claim 1, wherein a period of a PRB set used for transmission of the physical channel in sequence format in a resource pool is the same as a period of a PRB set available for physical sidelink feedback channel (PSFCH) transmission in the resource pool, and the PRB set used for transmission of the physical channel in sequence format is located at the last two Orthogonal Frequency-Division Multiplexing (OFDM) symbols available for sidelink communication in one slot.

3. The method according to claim 2, wherein at least one PRB comprised in the PRB set used for transmission of physical channel in sequence format is the same as at least one PRB comprised in the PRB set used for PSFCH transmission, or the at least one PRB comprised in the PRB set used for transmission of the physical channel in sequence format is at least in part different from the at least one PRB comprised in the PRB set used for PSFCH transmission.

4. The method according to claim 1, wherein determining, by the first terminal, the transmission resource for the physical channel in sequence format, comprises:

determining, by the first terminal from the at least one PRB, the PRB used for transmitting the physical channel in sequence format according to a source terminal identity indicated in Sidelink Control Information (SCI) used for scheduling the first PSSCH;

wherein the at least one PRB is at least one PRB for the physical channel in sequence format corresponding to a subchannel in a slot where the first PSCCH is located.

5. The method according to claim 1, further comprising:

determining, by the first terminal, the at least one PRB for the physical channel in sequence format corresponding to the subchannel in the slot where the first PSSCH is located:

$$[(i + j \cdot N^{PSACH}) \cdot M^{PSACH}_{subch,slot}, (i + 1 + j \cdot N^{PSACH}) \cdot M^{PSACH}_{subch,slot} - 1];$$

wherein $$M^{PSACH}_{subch,slot}$$

represents the number of the at least one PRB for the physical channel in sequence format corresponding to one subchannel in the slot where the first PSSCH is located, $N^{PSACH}$ represents a period of a resource for the physical channel in sequence format, a start of the first PSSCH is located in slot i, the slot i occupies one or more subchannels starting from a j-th subchannel, $0 \leq i < N^{PSACH}$, $0 \leq j < N_{subch}$, $N_{subch}$ represents the number of subchannels comprised in a resource pool used by the first terminal;

wherein the at least one PRB is at least one PRB for the physical channel in sequence format corresponding to a subchannel in a slot where the first PSCCH is located.

6. The method according to claim 1, wherein:

the first PSSCH is located at a time unit n, and the transmission resource for the physical channel in sequence format is located at a time unit m; and an interval between n and m is not smaller than a first threshold, and the time unit comprises at least one of a symbol or a slot.

7. The method according to claim 1, wherein determining, by the first terminal, the transmission resource for the physical channel in sequence format according to time-frequency resource positions of the Q reserved resources indicated by the second terminal comprises:

determining, by the first terminal, a slot j for transmitting the physical channel in sequence format according to a slot m corresponding to the Q reserved resources;

wherein the slot m is a slot where the Q reserved resources are located, or the slot m is a slot where the first reserved resource among the Q reserved resources is located, and the slot j is the maximum value of a slot index where there exists a resource for the physical channel in sequence format before $m - T_{proc,1} - T_{proc,0}$, $T_{proc,0}$ is the time for the second terminal to decode the reference resource set, $T_{proc,i}$ is the time for the second terminal to respond according to the reference resource set.

8. The method according to claim 1, wherein determining, by the first terminal, the transmission resource for the physical channel in sequence format according to time-frequency resource positions of the Q reserved resources indicated by the second terminal comprises:

determining, by the first terminal, the PRB used for transmitting the physical channel in sequence format from at least one PRB according to a source terminal identity indicated in SCI used for indicating the Q reserved resources;

wherein the at least one PRB is at least one PRB for the physical channel in sequence format corresponding to one subchannel in one slot.

9. A wireless communication method, comprising:

receiving, by a second terminal, a reference resource set transmitted from a first terminal through a physical channel in sequence format, wherein the reference resource set is carried in the physical channel in sequence format, wherein a Physical Resource Block (PRB) set available for transmission of the physical channel in sequence format is determined by the first terminal, a transmission resource for the physical channel in sequence format is determined by the first terminal according to a time-frequency resource position of a first Physical Sidelink Shared Channel (PSSCH) transmitted by the second terminal, wherein a PRB used for transmitting the physical channel in sequence format belongs to the PRB set for transmission of the physical channel in sequence format determined by the first terminal;

wherein the transmission resource for the physical channel in sequence format is determined by the first terminal according to time-frequency resource positions of Q reserved resources indicated by the second terminal, wherein Q is a positive integer;

wherein:

the reference resource set comprises Q resources used for at least one of Physical Sidelink Control Channel (PSCCH) or PSSCH transmission, the Q resources correspond to the Q reserved resources indicated by the second terminal through a PSCCH, and Q≤2, or, the Q resources correspond to the Q reserved resources indicated by the second terminal through a PSSCH, wherein the reference resource set is used for the second terminal to perform resource selection or resource reselection, or the reference resource set is used to trigger the second terminal to perform resource selection or resource reselection.

10. The method according to claim 9, wherein receiving, by the second terminal, the reference resource set transmitted from the first terminal through the physical channel in sequence format, comprises:

detecting, by the second terminal, the physical channel in sequence format carrying the reference resource set on a target resource for the physical channel in sequence format.

11. The method according to claim 10, wherein the target resource comprises at least one of the following:

a resource for the physical channel in sequence format corresponding to a reserved resource indicated by the second terminal, a resource for the physical channel in sequence format corresponding to a Physical Sidelink Shared Channel (PSSCH) transmitted by the second terminal for indicating a reserved resource, a resource for the physical channel in sequence format corresponding a PSSCH scheduled by a Physical Sidelink Control Channel (PSCCH) transmitted by the second terminal for indicating a reserved resource, and a resource for the physical channel in sequence format corresponding to trigger signaling transmitted by the second terminal for triggering the first terminal to provide the reference resource set.

12. The method according to claim 9, further comprising:

in response to one or more resources in the reference resource set conflicting with a resource reserved by another terminal, reselecting, by the second terminal, a reserved resource; or, in response to the second terminal determining that there is a half-duplex restriction according to the reference resource set, reselecting, by the second terminal, a reserved resource.

13. A terminal device comprising: a processor and a memory, wherein the memory is used to store a computer program, and the processor is used to call and run the computer program stored in the memory to cause the terminal device to:

transmit a reference resource set to a second terminal through a physical channel in sequence format, wherein the reference resource set is carried in the physical channel in sequence format;

wherein the reference resource set is used for the second terminal to perform resource selection or resource reselection, or the reference resource set is used to trigger the second terminal to perform resource selection or resource reselection;

wherein the processor is used to call and run the computer program stored in the memory to cause the terminal device to:

determine a Physical Resource Block (PRB) set available for transmission of the physical channel in sequence format;

wherein the processor is used to call and run the computer program stored in the memory to cause the terminal device to:

determine a transmission resource for the physical channel in sequence format according to a time-frequency resource position of a first Physical Sidelink Shared Channel (PSSCH) transmitted by the second terminal, wherein a PRB used for transmitting the physical channel in sequence format belongs to the PRB set for transmission of the physical channel in sequence format determined by the terminal device;

wherein the processor is used to call and run the computer program stored in the memory to cause the terminal device to:

determine the transmission resource for the physical channel in sequence format according to time-frequency resource positions of Q reserved resources indicated by the second terminal, wherein Q is a positive integer;

wherein:

the reference resource set comprises Q resources used for at least one of Physical Sidelink Control Channel (PSCCH) or PSSCH transmission, the Q resources correspond to the Q reserved resources indicated by the second terminal through a PSCCH, and Q≤2, or, the Q resources correspond to the Q reserved resources indicated by the second terminal through a PSSCH.

14. The terminal device according to claim 13, wherein a period of a PRB set used for transmission of the physical channel in sequence format in a resource pool is the same as a period of a PRB set available for physical sidelink feedback channel (PSFCH) transmission in the resource pool, and the PRB set used for transmission of the physical channel in sequence format is located at the last two Orthogonal Frequency-Division Multiplexing (OFDM) symbols available for sidelink communication in one slot.

15. The terminal device according to claim 14, wherein at least one PRB comprised in the PRB set used for transmission of physical channel in sequence format is the same as at least one PRB comprised in the PRB set used for PSFCH transmission, or the at least one PRB comprised in the PRB set used for transmission of the physical channel in sequence format is at least in part different from the at least one PRB comprised in the PRB set used for PSFCH transmission.

\* \* \* \* \*